United States Patent
Luo et al.

(10) Patent No.: US 12,147,004 B2
(45) Date of Patent: Nov. 19, 2024

(54) METHOD, APPARATUS, AND SYSTEM FOR IDENTIFYING SURFACE LOCATIONS CORRESPONDING TO SUBSURFACE GEOHAZARDS BASED ON FREQUENCY RATIOS AMONG SEISMIC TRACE SIGNALS

(71) Applicant: Saudi Arabian Oil Company, Dhahran (SA)

(72) Inventors: Yi Luo, Dhahran (SA); Tong Wang Fei, Dhahran (SA); Mohammed Mubarak, Safwa (SA); Ali Ameen Almomin, Dammam (SA); Yi He, Beijing (CN)

(73) Assignee: Saudi Arabian Oil Company, Dhahran (SA)

( * ) Notice: Subject to any disclaimer, the term of this patent is extended or adjusted under 35 U.S.C. 154(b) by 380 days.

(21) Appl. No.: 17/646,966

(22) Filed: Jan. 4, 2022

(65) Prior Publication Data

US 2023/0213670 A1 Jul. 6, 2023

(51) Int. Cl.
*G01V 1/30* (2006.01)
*G01V 1/36* (2006.01)

(52) U.S. Cl.
CPC .............. *G01V 1/301* (2013.01); *G01V 1/362* (2013.01); *G01V 2210/1212* (2013.01); *G01V 2210/21* (2013.01); *G01V 2210/322* (2013.01)

(58) Field of Classification Search
None
See application file for complete search history.

(56) References Cited

U.S. PATENT DOCUMENTS

| 5,148,110 A | 9/1992 | Helms |
| 5,583,825 A | 12/1996 | Carrazzone et al. |
| 5,850,622 A | 12/1998 | Vassiliou |
| | (Continued) | |

FOREIGN PATENT DOCUMENTS

| WO | 2006011826 A1 | 2/2006 |
| WO | 2020033465 A1 | 2/2020 |

OTHER PUBLICATIONS

Islaka et al; High-Resolution Seismic Reflection Investigation of Subsidence and Sinkholes 2 at an Abandoned Coal Mine Site in South Africa; Apr. 1, 2019.

(Continued)

*Primary Examiner* — Lisa M Caputo
*Assistant Examiner* — Cynthia L Davis
(74) *Attorney, Agent, or Firm* — Leason Ellis LLP

(57) ABSTRACT

A method and apparatus of locating subsurface geohazards in a geographical area that includes: receiving a plurality of seismic trace signals in the geographical area based on a shot gather from a seismic shot source; isolating and stacking the plurality of seismic trace signals to generate a windowed trace signal associated with refraction traces from the seismic shot source; transforming the windowed trace signal to a frequency domain; calculating a low frequency to high frequency ratio for the transformed trace signal; outputting the calculated ratio to a two-dimensional array representing the geographical area at a source location and at a mean receiver location; repeating the steps for a plurality of other shot gathers in the geographical area; and multiplying each source location ratio with one or more mean receiver location ratios on the two-dimensional array to generate a final frequency ratio map.

17 Claims, 16 Drawing Sheets

(56) References Cited

U.S. PATENT DOCUMENTS

| | | | |
|---|---|---|---|
| 6,021,379 | A | 2/2000 | Duren |
| 6,904,368 | B2 | 6/2005 | Reshef et al. |
| 6,985,816 | B2 | 1/2006 | Sorrells et al. |
| 7,356,410 | B2 | 4/2008 | Rode |
| 7,606,691 | B2 | 10/2009 | Calvert |
| 7,676,326 | B2 | 3/2010 | Podladchikov et al. |
| 7,725,265 | B2 | 5/2010 | Saenger |
| 7,729,862 | B2 | 6/2010 | Dewarrat |
| 7,796,468 | B2 | 9/2010 | Kellogg |
| 8,219,320 | B2 | 6/2012 | Saenger |
| 8,509,027 | B2 | 8/2013 | Strobbia et al. |
| 8,615,362 | B2 | 12/2013 | Laake |
| 9,081,107 | B2 | 7/2015 | Abma et al. |
| 9,606,253 | B2 | 3/2017 | Tonchia |
| 10,345,468 | B2 | 7/2019 | Poole |
| 2015/0369938 | A1 | 12/2015 | Romero, Jr. et al. |
| 2021/0149066 | A1 | 5/2021 | Wu et al. |

OTHER PUBLICATIONS

Li Wei; Processing and Interpretation of Three-Component Borehole/Surface Seismic Data over Gabor Gas Storage Field; Aug. 31, 2015.
Gacusan et al; Shallow seismic reflection imaging of the Inabanga-Clarin portion of the North Bohol Fault, Central Visayas, Philippines; Jan. 1, 2019.
Hofstede et al; Evidence for a grounding line fan at the onset of a basal channel under the ice shelf of Support Force Glacier, Antarctica, revealed by reflection seismics; Mar. 25, 2021.
Alamooti; A Comparative Case Study of Reflection Seismic Imaging Method; Jan. 1, 2018.
Abdulrahman Al Shuhan; Advance Reasech Center, Saudi Aramco; Application of Super-Virtual Seismic Refraction Interferometry to Enhance First Arrivals: A case study from Saudi Arabia; Jan. 2012.
Irnaka at al; SEISGAMA: A Free C# Based Seismic Data ProcessingSoftware Platform; Hindawi, International Journal of Geophysicsvol. 2018, Article ID 2913591, 8 pageshttps://doi.org/10.1155/2018/2913591.
Nakata et al; Monitoring a Building Using DeconvolutionInterferometry. I: Earthquake-Data Analysis; Bulletin of the Seismological Society of America, vol. 103, No. 3, pp. 1662-1678, Jun. 2013, doi: 10.1785/0120120291.
Mustafa Senkaya et al; First Arrival Picking in Seismic Refraction Data by Cross-Corelation Technique, Conference Paper; Jan. 2011.
Seismic Refraction and Reflection Methods; www.geovision.com.
Al-Muhaidib et al; DrillCam: A fully integrated real-time system to image and predict ahead and around the bit; Aramco Research Center-Beijing, Aramco Asia; SEG International Exposition and 88th annual meeting; p. 719-723.
Kaoru Sawazaki et al; Time-lapse changes ofP- andS-wave velocities and shear wavesplitting in the first year after the 2011 Tohoku earthquake, Japan:shallow subsurface; Geophys. J. Int.(2013)193,238-251; Jul. 23, 2012.
Andrey Bakulin et al.; Smart DAS upholes for simultaneous land near-surface characterization and subsurface imaging; The Leading Edge, Dec. 2017; pp. 1001-1008.
Yi Luo; System and Method for Determining a Likelihood of Striking Subsurface Geohazards Using Coda Wave Trains; U.S. Appl. No. 17/240,303, filed Apr. 26, 2021.

METHOD, APPARATUS, AND SYSTEM FOR IDENTIFYING SURFACE LOCATIONS CORRESPONDING TO SUBSURFACE GEOHAZARDS BASED ON FREQUENCY RATIOS AMONG SEISMIC TRACE SIGNALS

FIELD

The present disclosure generally relates to geological surveying systems and, more specifically, to a computer-implemented method of identifying surface locations that correspond to subsurface geohazards using seismic shot data in aid of avoiding such geohazards in natural resource extractions.

BACKGROUND

In natural resource extractions, such as in the oil and gas industry, considerable equipment and manpower are needed to effectively extract the resources, which are often deposited deep underground or even under deep sea beds. In view of the considerable investments needed to extract such resources, there is an ongoing need to accurately and cost effectively locate such resource deposits that are suitable for extraction.

Correspondingly, there has also been an ongoing need to accurately and cost effectively identify and locate any hazards that may obstruct access to these resource deposits. Subsurface geohazards, such as faulted rocks, sink holes, unconsolidated depositions, and other underground defects can reside above or around identified resource deposits in the subsurface strata. These geohazards can cause problems during drilling operations, including damage or loss of equipment, loss of access to oil or natural gas reservoirs, and harm to individuals and property near the drilling site. Additionally, such geohazards can be present at various depths that may not be adequately accounted for in surveying analyses that are devoted to natural resource reserve identification and location.

SUMMARY

In view of the above-described long felt and unmet need for accurately and cost effectively locating subsurface geohazards, the present disclosure provides a straightforward and accurate process for identifying and locating such geohazards.

As noted above, geological hazards are mainly caused by underground defects. The defects are often characterized by faulted rocks, sink holes, and unconsolidated depositions. All these imperfections of the media cause wave attenuation and scattering. Such attenuations and scattering are proportional with respect to frequencies, in other words, the higher the frequency the more loss of seismic energy. This can be detected and identified by seismic wave refraction and/or reflection analyses. Based on this characteristic, the present disclosure provides a technique for analyzing seismic shot gather data to locate the aforementioned seismic energy attenuation and scattering by identifying and amplifying frequency ratio differences among seismic trace signals.

According to an exemplary embodiment of the present disclosure, a method of locating subsurface geohazards in a geographical area, comprises: (1) receiving, by one or more processing apparatuses via a communication interface, a plurality of seismic trace signals generated by a corresponding plurality of receivers based on a shot gather from a seismic shot source, at least one of the seismic shot source and the corresponding plurality of receivers being located in the geographical area; (2) picking, by the one or more processing apparatuses, a respective first break time of each of the plurality of seismic trace signals; (3) shifting, by the one or more processing apparatuses, the each seismic trace signal based on the picked respective first break time to flatten the shot gather; (4) stacking, by the one or more processing apparatuses, at least a subset of the plurality of seismic trace signals generated by at least a subset of the corresponding plurality of receivers within an offset range into a stacked trace signal; (5) muting, by the one or more processing apparatuses, an output of the stacked trace signal after a predetermined time window to generate a windowed trace signal; (6) applying, by the one or more processing apparatuses, a Fourier transform over time to the windowed trace signal; (7) calculating, by the one or more processing apparatuses, a low frequency to high frequency ratio for the transformed trace signal; (8) outputting, by the one or more processing apparatuses, the calculated ratio to a two-dimensional array representing the geographical area at a source location corresponding to the seismic shot source and at a mean receiver location corresponding to a mean location for the some or all of the corresponding plurality of receivers within the offset range; (9) repeating, by the one or more processing apparatuses, steps (1) to (8) for a plurality of other shot gathers, wherein at least one of another seismic shot source and another corresponding plurality of receivers is located in the geographical area; (10) multiplying, by the one or more processing apparatuses, each source location ratio with one or more mean receiver location ratios on the two-dimensional array to generate a final frequency ratio map; (11) identifying, by the one or more processing apparatuses, one or more high risk surface zones on the final frequency ratio map based on a multiplied ratio threshold; and (12) outputting, by the one or more processing apparatuses via the communication interface, the final frequency ratio map indicating the one or more identified high risk surface zones.

According to an exemplary embodiment of the present disclosure, a method of locating subsurface geohazards in a geographical area, comprises: (1) receiving, by one or more processing apparatuses via a communication interface, a plurality of seismic trace signals generated by a corresponding plurality of receivers based on a shot gather from a seismic shot source, at least one of the seismic shot source and the corresponding plurality of receivers being located in the geographical area; (2) isolating and stacking, by the one or more processing apparatuses, the plurality of seismic trace signals to generate a windowed trace signal associated with refraction traces from the seismic shot source; (3) transforming, by the one or more processing apparatus, the windowed trace signal to a frequency domain; (4) calculating, by the one or more processing apparatuses, a low frequency to high frequency ratio for the transformed trace signal; (5) outputting, by the one or more processing apparatuses, the calculated ratio to a two-dimensional array representing the geographical area at a source location corresponding to the seismic shot source and at a mean receiver location corresponding to a mean location for the some or all of the corresponding plurality of receivers related to the windowed trace signal; (6) repeating, by the one or more processing apparatuses, steps (1) to (5) for a plurality of other shot gathers, wherein at least one of another seismic shot source and another corresponding plurality of receivers is located in the geographical area; (7) multiplying, by the one or more processing apparatuses, each source location ratio with one or more mean receiver location ratios on the two-dimensional array to generate a final frequency ratio map; (8) identifying, by the one or more processing apparatuses, one or more high risk surface zones on the final frequency ratio map based on a multiplied ratio threshold; and (9) outputting, by the one or more processing apparatuses via the communication interface, the final frequency ratio map indicating the one or more identified high risk surface zones.

In embodiments, the isolating and stacking comprises: picking, by the one or more processing apparatuses, a respective first break time of each of the plurality of seismic trace signals; shifting, by the one or more processing apparatuses, the each seismic trace signal based on the picked respective first break time to flatten the shot gather; stacking, by the one or more processing apparatuses, at least a subset of the plurality of seismic trace signals generated by at least a subset of the corresponding plurality of receivers within an offset range into a stacked trace signal; and muting, by the one or more processing apparatuses, an output of the stacked trace signal after a predetermined time window to generate the windowed trace signal.

In embodiments, the offset range is between approximately 2200 meters (m) and 6000 m.

In embodiments, the predetermined time window is between 0 milliseconds (ms) and approximately 250 ms.

In embodiments, the transforming comprises applying, by the one or more processing apparatuses, a Fourier transform over time to the windowed trace signal.

In embodiments, the method further comprises identifying, by the one or more processing apparatuses, an asset for relocation based on proximity to the one or more identified high risk surface zones in the outputted final frequency ratio map.

In embodiments, the asset for relocation is identified based on a proximity within approximately 200 meters (m) to 300 m from the one or more identified high risk surface zones in the outputted final frequency ratio map.

In embodiments, the windowed trace signal is formed by the isolating and stacking of the plurality of seismic trace signals generated by a portion of the corresponding plurality of receivers that are within an offset range from the seismic shot source and that are generated within a predetermined time window from respective first break times of the plurality of seismic trace signals.

According to an exemplary embodiment of the present disclosure, an apparatus adapted to locate subsurface geohazards in a geographical area, comprises: a processor; a communication interface to one or more networks; a non-transitory computer-readable memory operatively connected to the one or more processors and having stored thereon machine-readable instructions to: (1) receive, via the communication interface, a plurality of seismic trace signals generated by a corresponding plurality of receivers based on a shot gather from a seismic shot source, at least one of the seismic shot source and the corresponding plurality of receivers being located in the geographical area; (2) isolate and stack, by the one or more processors, the plurality of seismic trace signals to generate a windowed trace signal associated with refraction traces from the seismic shot source; (3) transform, by the one or more processors, the windowed trace signal to a frequency domain; (4) calculate, by the one or more processors, a low frequency to high frequency ratio for the transformed trace signal; (5) output, by the one or more processors, the calculated ratio to a two-dimensional array representing the geographical area at a source location corresponding to the seismic shot source and at a mean receiver location corresponding to a mean location for the some or all of the corresponding plurality of receivers related to the windowed trace signal; (6) repeat, by the one or more processors, elements (1) to (5) for a plurality of other shot gathers, wherein at least one of another seismic shot source and another corresponding plurality of receivers is located in the geographical area; (7) multiply, by the one or more processors, each source location ratio with one or more mean receiver location ratios on the two-dimensional array to generate a final frequency ratio map; (8) identify, by the one or more processors, one or more high risk surface zones on the final frequency ratio map based on a multiplied ratio threshold; and (9) output, via the communication interface, the final frequency ratio map indicating the one or more identified high risk surface zones.

In embodiments, the machine-readable instructions further comprise, for the (2) isolate and stack element, instructions to: pick, by the one or more processors, a respective first break time of each of the plurality of seismic trace signals; shift, by the one or more processors, the each seismic trace signal based on the picked respective first break time to flatten the shot gather; stack, by the one or more processors, at least a subset of the plurality of seismic trace signals generated by at least a subset of the corresponding plurality of receivers within an offset range into a stacked trace signal; and mute, by the one or more processors, an output of the stacked trace signal after a predetermined time window to generate the windowed trace signal.

In embodiments, the offset range is between approximately 2200 meters (m) and 6000 m.

In embodiments, the predetermined time window is between 0 milliseconds (ms) and approximately 250 ms.

In embodiments, the machine-readable instructions further comprise, for the (3) transform element, instructions to apply, by the one or more processors, a Fourier transform over time to the windowed trace signal.

In embodiments, the machine-readable instructions further comprise instructions to identify an asset for relocation based on proximity to the one or more identified high risk surface zones in the outputted final frequency ratio map.

In embodiments, the asset for relocation is identified based on a proximity within approximately 200 meters (m) to 300 m from the one or more identified high risk surface zones in the outputted final frequency ratio map.

In embodiments, the windowed trace signal is formed by the isolating and stacking the plurality of seismic trace signals generated by a portion of the corresponding plurality of receivers that are within an offset range from the seismic shot source and that are generated within a predetermined time window from respective first break times of the plurality of seismic trace signals.

BRIEF DESCRIPTION OF THE DRAWINGS

Various exemplary embodiments of this disclosure will be described in detail, with reference to the following figures, wherein.

DETAILED DESCRIPTION

Figure 1:
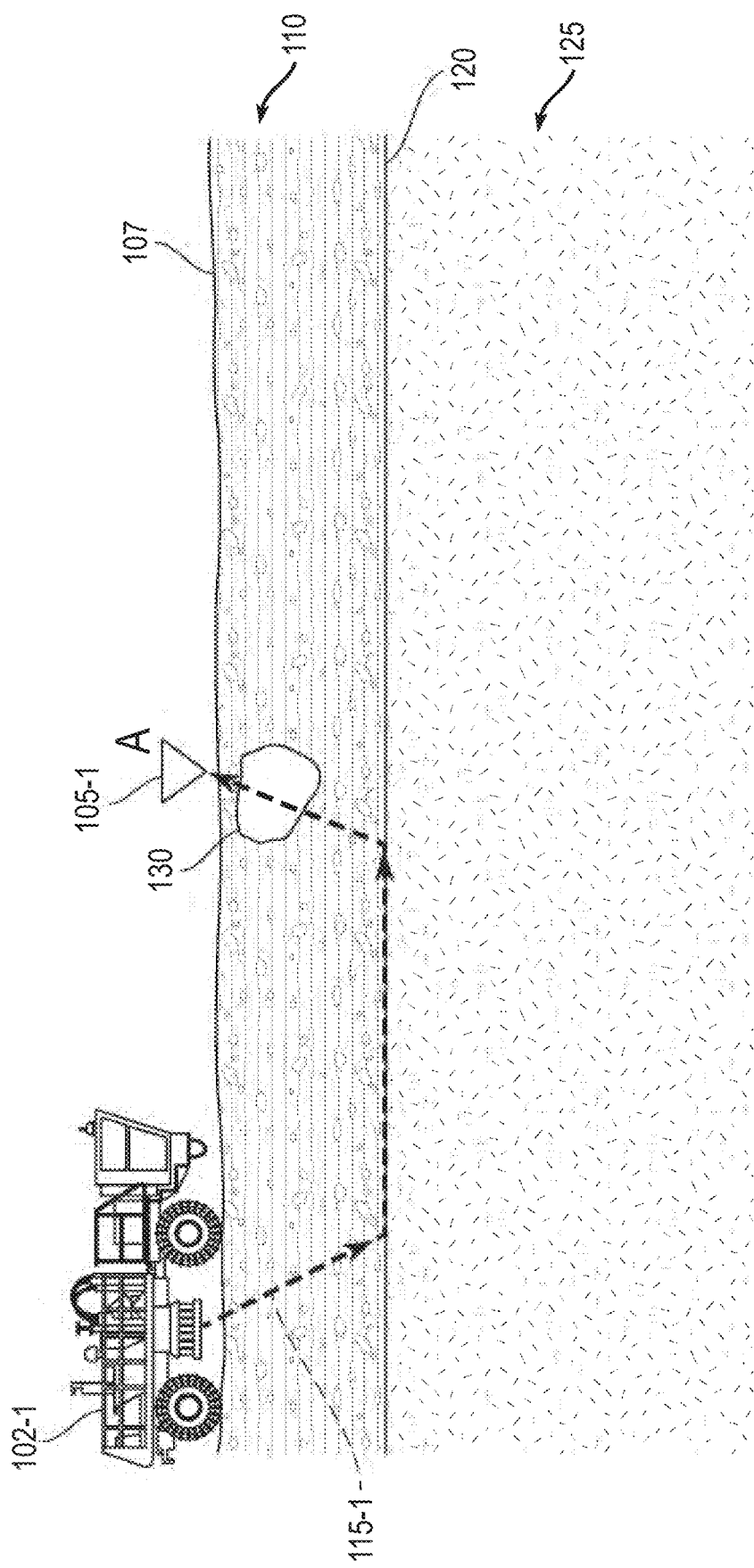
FIG. 1 is a diagram illustrating an effect of a subsurface geohazard on a trace signal from a seismic shot source to a receiver where the geohazard is proximate the receiver.

The present disclosure is directed to a system, a method, and associated apparatus(es) for analyzing seismic shot gather data to identify surface locations that correspond to subsurface geohazards so that such geohazards can be avoided in subsequent natural resource extraction operations. As discussed above, there has been a long-felt and persistent need for accurate and easy-to-interpret information for avoiding such geohazards considering the large investments associated with setting up the necessary equipment and operations for natural resource extractions. Accordingly, the present disclosure provides a technique for analyzing seismic shot gather data that can be obtained for any purpose, including but not limited to natural resource reserve surveys, geological surveys, or dedicated geohazard surveys. The flexibility of the presently disclosed technique allows for quick interpretation of high-risk surface regions that can be either avoided or navigated via more detailed surveys and analyses if natural resources would be otherwise inaccessible from other, safer surface regions.

Applicant hereby incorporates by reference the entirety of co-pending U.S. patent application Ser. No. 17/240,303 filed on Apr. 26, 2021, which includes disclosure of a system for obtaining seismic shot gather data.

The headings used herein are for organizational purposes only and are not meant to be used to limit the scope of the description or the claims. As used throughout this application, the words "may" and "can" are used in a permissive sense (i.e., meaning having the potential to), rather than the mandatory sense (i.e., meaning must). Similarly, the words "include," "including," and "includes" mean including but not limited to. To facilitate understanding, like reference numerals have been used, where possible, to designate like elements common to the figures. As used throughout this application, the word "system" can be used interchangeably with "device," "apparatus" and "network," respectively, where a system can be embodied by a singular apparatus, device, and the like, and be comprised in or comprise a computer-implemented network of plural entities, apparatuses, devices, etc.

FIG. 1 is an illustration of a seismic shot source 102-1 and an exemplary receiver 105-1 at a predetermined distance and direction (location "A") from source 102-1. According to an exemplary embodiment, seismic shot source 102-1 is a mobile sound generator that is adapted to generate sound waves with sufficient energy to propagate beneath ground surface 107 through subsurface media 110 to reach at least receiver 105-1. For example, the mobile sound generator can be a subsurface sound wave generator mounted in a truck (e.g., vibroseis). In certain embodiments, source 102-1 can include a hammer and plate, a sound gun, a vibrator, a weight drop, and the like, and multiple additional sources (not shown) can be arranged in and around a region of interest for surveying the subsurface characteristics. Alternatively, explosives can be arranged at predetermined locations—for example, in shot holes—for surveying purposes.

According to an exemplary embodiment, receiver 105-1 is a geophone inserted into ground surface 107 to detect and receive the sound waves generated by source 102-1. In certain embodiments, receivers in additional to receiver 105-1 can be arranged at predetermined locations for surveying the region of interest with corresponding sound sources, such as source 102-1, in and around the region of interest.

According to an exemplary embodiment, source 102-1 is adapted to direct a shot of seismic energy into the subsurface media 110 beneath a ground surface 107 or a geological subsurface in one or more directions around source 102-1. For example, as shown in FIG. 1, shot component signal 115-1 propagates from source 102-1 into subsurface media 110 in a direction towards receiver 105-1. FIG. 1 illustrates a refraction trace by receiver 105-1, where shot component signal 115-1 returns to surface 107 near receiver 105-1 by refraction at a subsurface interface 120 between subsurface media 110 and its substrata 125. The refraction at the interface can be due to a subsurface discontinuity, for example. As can be appreciated by one of ordinary skill in the art, refraction is a natural wave propagation phenomenon that depends on the properties of the top earth layers (formations). For refraction to occur, the propagation velocity of a wave through a second layer (such as substrata 125 illustrated in FIG. 1) must by higher than the that of a first layer (such as subsurface media 110 illustrated in FIG. 1) above the second layer. The distance from the source (102-1) at which refraction energy (traveling at the velocity of the second layer 125) arrives earlier than the direct wave (traveling at the velocity of the first layer 110) depends on the ratio between the two velocities as well as the thickness of the first layer 110.

In embodiments, receivers (105-1 and further receivers of the same construction (not shown)) can also be adapted to detect and receive seismic reflections where, for example, a seismic shot component signal is reflected to surface 107 at subsurface interface 120.

Figure 7:
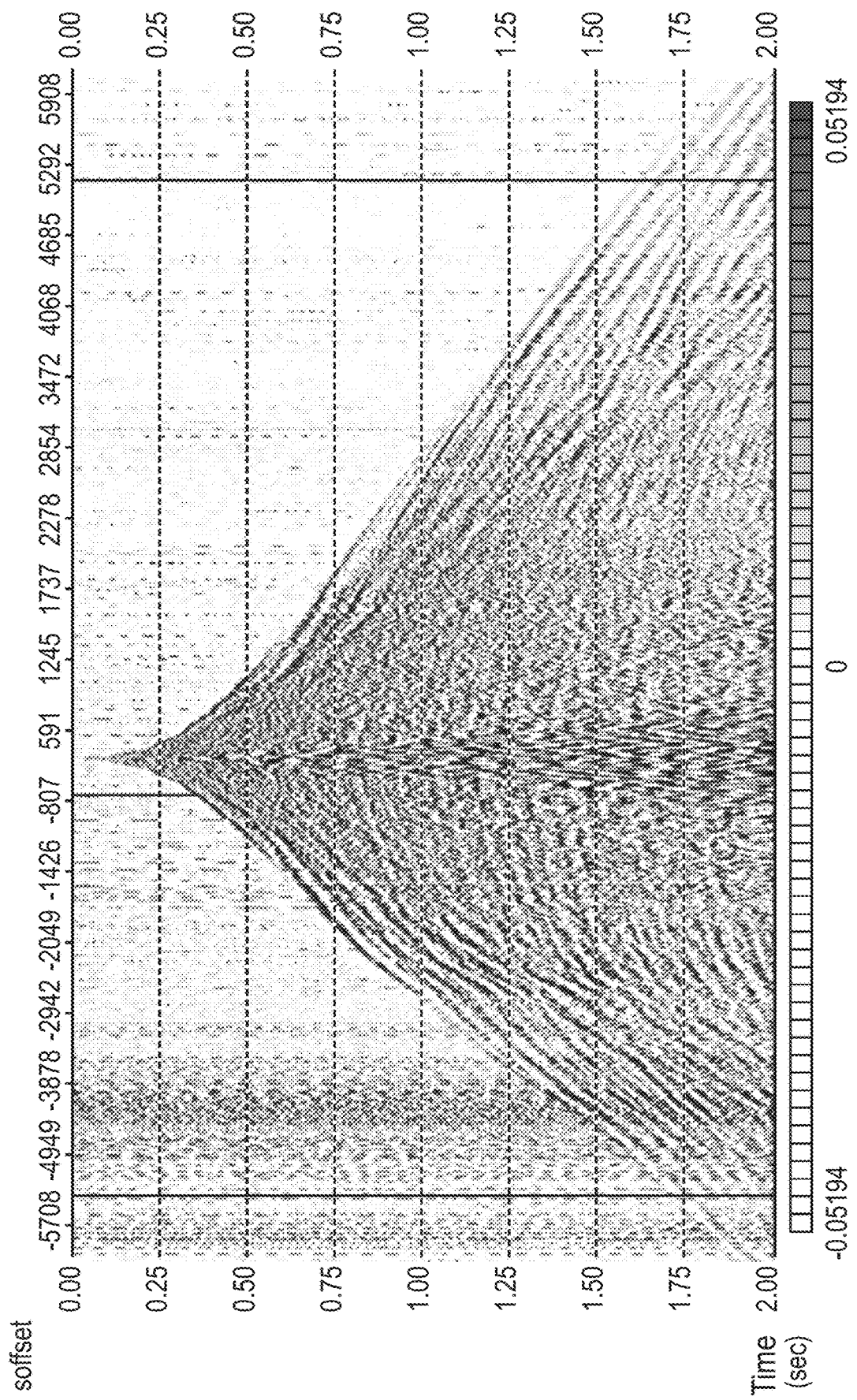
FIG. 7 is a graph plot of an example result from process step s401 of FIG. 4.

As will be described below in the "examples" subsection, FIG. 7 is an example plot of a shot gather from 5000 receivers (105) where the refraction energy can be identified as early arrival starting from offset ~1500 m (meters). In other words, n=5000 for receivers 105-n in FIG. 3 for the example illustrated in FIG. 7. Additionally, relevant data for analyses were from receivers (105) at offsets in the range of 2200 m-6000 m from the shot source (102).

FIG. 1 illustrates a scenario where receiver 105-1 is placed at a location ("A") on surface 107 that is proximate a subsurface defect 130, where shot component signal 115-1 travels through defect 130 before reaching receiver 105-1. Thus, wave attenuation and scattering effects would be detected by a seismic refraction trace of shot component signal 115-1 from source 102-1 at receiver 105-1. As noted before, degradation of high frequency components of signal 115-1 would be more pronounced because high frequency signals are more susceptible to such wave attenuation and scattering by imperfections and changes in media 110. Correspondingly, traces of the same shot from source 102-1 by other receivers (not shown) that are placed at locations away from defect 130 would not detect any such effects. Accordingly, as will be described in further detail below, processing of signal 115-1 can be performed to detect characteristic changes among plural trace signals with respect to their respective high frequency and low frequency components to identify and locate subsurface defects, such as defect 130.

Figure 2:
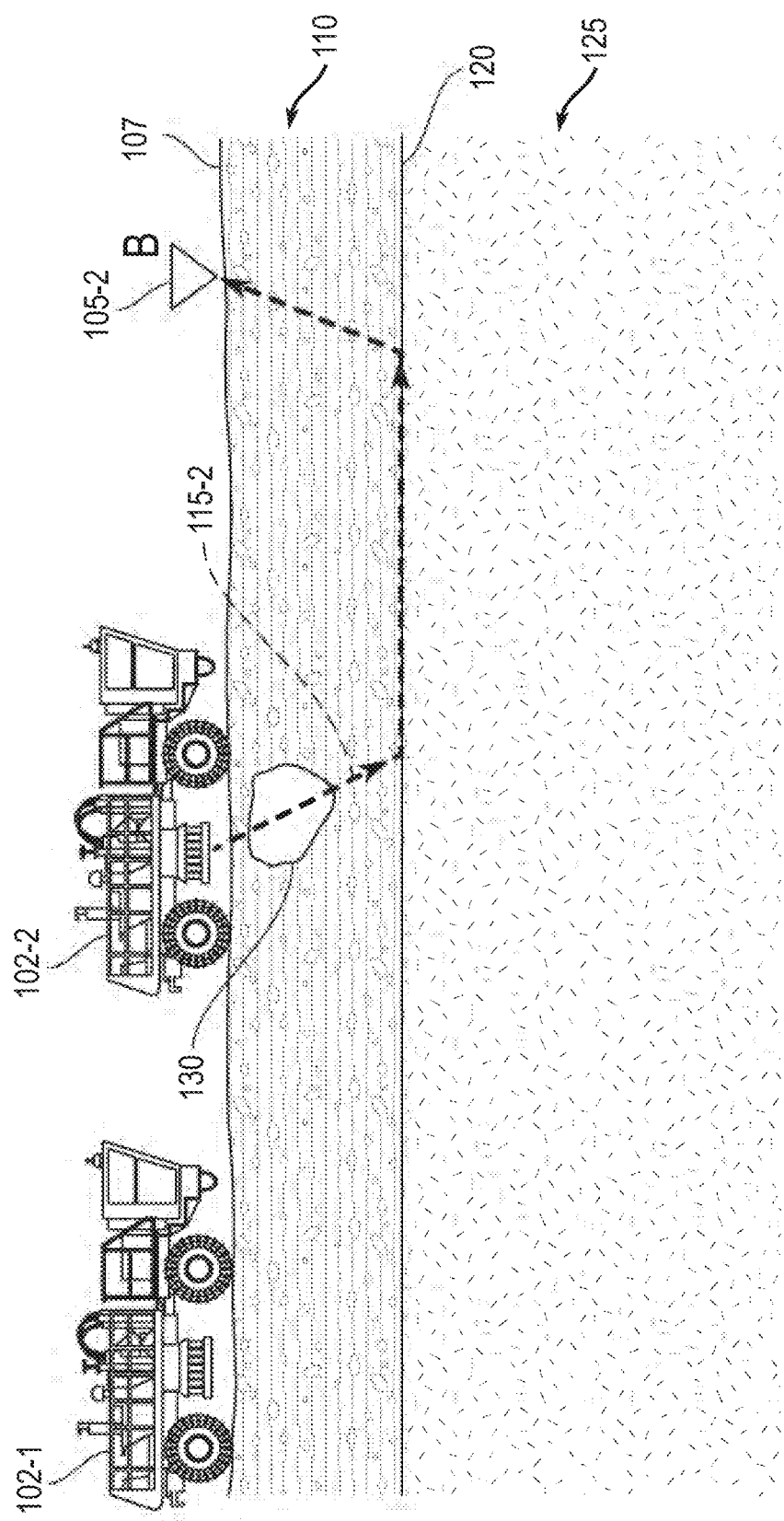
FIG. 2 is a diagram illustrating an effect of a subsurface geohazard on a trace signal from a seismic shot source to a receiver where the geohazard is proximate the seismic shot source.

As an example, FIG. 2 illustrates another shot source 102-2 that is located at or near receiver 105-1 shown in FIG. 1 (location "A") and another receiver 105-2 that is placed a predetermined distance and direction (location "B") from source 102-2. In embodiments, receiver 105-2 can be at same or different distances and directions from source 102-2 as receiver 105-1 is from source 102-1. According to an exemplary embodiment, receivers (105) are placed at distances (offsets) from a source (102) that range from hundreds of meters (m) (e.g., 100 m) to kilometers (km) (e.g., 20 km). FIG. 2 shows a shot component signal 115-2 from source 102-2 to receiver 105-2, which signal 115-2 propagates through defect 130 before reaching interface 120 and, thereafter, returning to ground surface 107 by refraction at receiver 105-2 (or location "B"). In contrast from FIG. 1, if defect 130 is beneath the source location (102-2) instead of the receiver location (105-1), defect 130 would be seen by traces associated with the source (102-2). In other words, traces at various locations and corresponding receivers (not shown) from source 102-2 would embody the aforementioned wave attenuation and scattering effects, which again are more pronounced for high frequency components of such traces. Thus, as will be described in further detail below, trace signal processing to isolate and identify these effects among high and low frequency components and among source and receiver locations results in an accurate mapping of media defects, such as defect 130, that are traversed by the trace signals. Advantageously, the process of the present disclosure can be applied to different types of shot gather data without the need for customization or exorbitant processing load.

Figure 3:
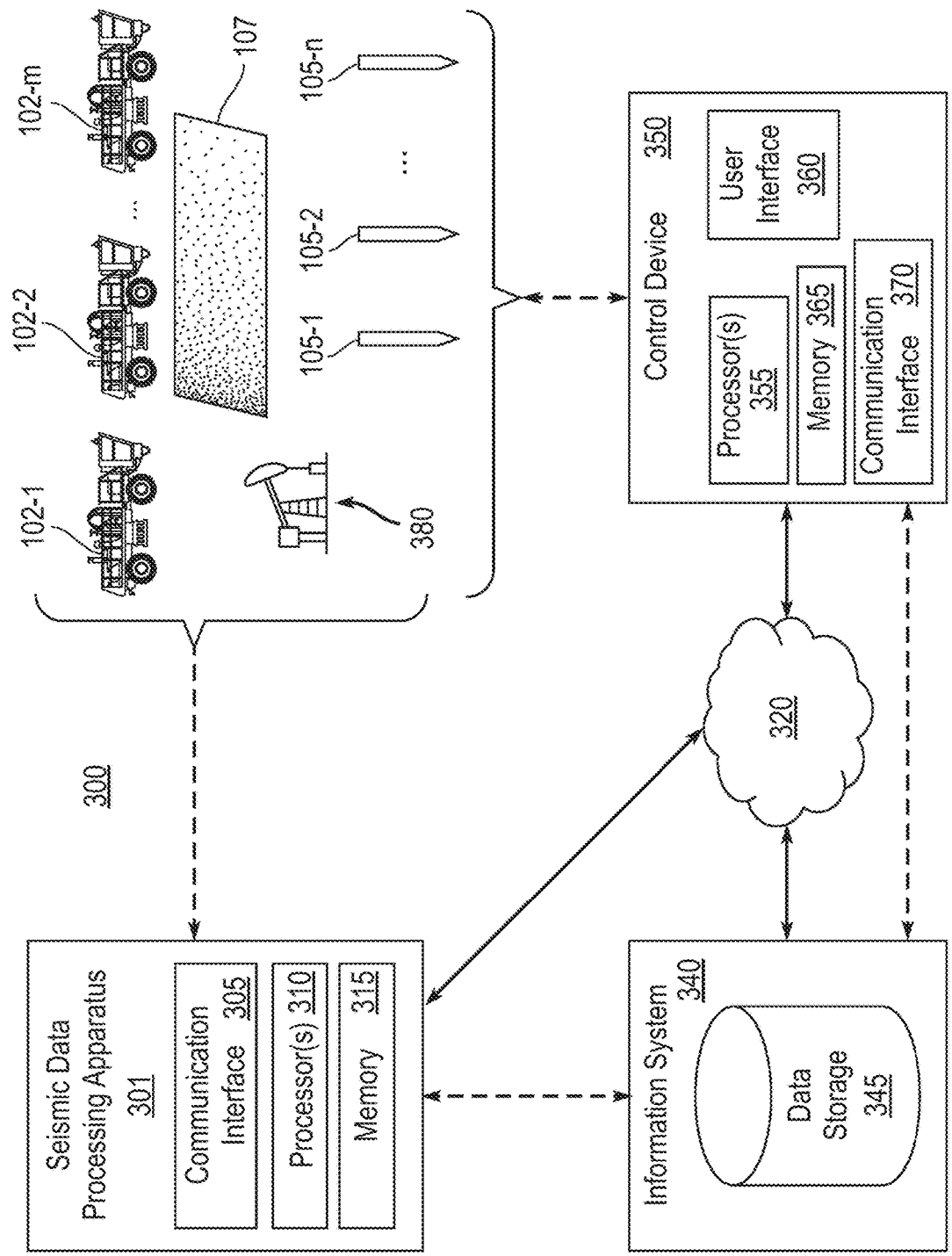
FIG. 3 is a schematic diagram illustrating a network, system, and apparatuses adapted to analyze seismic shot gather data to identify and locate subsurface geohazards in accordance with an exemplary embodiment of the present disclosure.

FIG. 3 is a schematic illustration a seismic data retrieval, processing, storage, and application system 300 according to an exemplary embodiment of the present disclosure. It should be understood by one or ordinary skill in the art that one or more of the devices, apparatuses, and systems shown in FIG. 3, and as described below, can be divided into plural entities. Conversely, the features and functionality provided by any plural entities shown in FIG. 3, and as described below, can be provided by a consolidated apparatus with suitable programming and attendant hardware components to provide such features and functionality.

As shown in FIG. 3, system 300 includes a seismic data processing apparatus 301 that is communicatively coupled to plural seismic sources 102-1, 102-2, . . . , 102-m and plural receivers 105-1, 105-1, . . . , 105-n via a network 320 and a control device 350. According to an exemplary embodiment, three dimensional (3D) seismic data acquired for either exploration or field development purposes can be used. As an example, the geohazard identification and location process of the present disclosure can be conducted on a seismic survey with sources in the tens of thousands (e.g. m~40,000) and with receivers in the hundreds of thousands (e.g. n~400,000). As can be appreciated by one of ordinary skill in the art, the density (number of sources and receiver per squared kilometer) can be adjusted so that closely spaced sources and receivers can improve the resolution of the generated geohazard location indicators.

Seismic sources 102-1, 102-2, . . . , 102-m and receivers 105-1, 105-1, . . . , 105-n are placed at respective locations on ground surface 107 in and around a region of interest for subsurface surveying and can be oriented in any known arrangements for such purposes. According to an exemplary embodiment, receivers (105) are arranged in a linear array (or spread) at regular intervals in relation to a source (102) to gather trace signals therefrom. As described above, seismic sources (102) are seismic shot generators and receivers (105) are vibration detectors, such as geophones and the like, that convert vibrations detected at their respective locations on ground surface 107 to electrical signals (e.g., voltages). The signals are collected by control device 350 and forwarded to information system 340 via network 320 for storing the collected seismic data in data storage 345. As will be described in further detail below, processing of the collected seismic data is conducted by seismic data processing apparatus 301, which can receive raw data from control device 350 when it is collected and/or retrieve stored data from information system 340.

As illustrated in FIG. 3, seismic data processing apparatus 301 is a computing apparatus that incorporates a communication interface 305, one or more processor devices 310, and a memory 315. One or more processor(s) 310 can include any suitable processing circuitry capable of controlling operations and functionality of seismic data processing apparatus 301, as well as facilitating communications between various components within seismic data processing apparatus 301. In some embodiments, processor(s) 310 can include a central processing unit ("CPU"), a graphic processing unit ("GPU"), one or more microprocessors, a digital signal processor, or any other type of processor, or any combination thereof. In some embodiments, the functionality of processor(s) 310 can be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 310 can include its own local memory, which can store program systems, program data, and/or one or more operating systems.

Memory 315 can include one or more types of storage mediums such as any volatile or non-volatile memory, or any removable or non-removable memory implemented in any suitable manner to store data for seismic data processing apparatus. For example, information can be stored using computer-readable instructions, data structures, and/or program systems. Various types of storage/memory can include, but are not limited to, hard drives, solid state drives, flash memory, permanent memory (e.g., ROM), electronically erasable programmable read-only memory ("EEPROM"), CD ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, memory 315 can be implemented as computer-readable storage media ("CRSM"), which can be any available physical media accessible by processor(s) 310 to execute one or more instructions stored within memory 315. In some embodiments, one or more applications can be run by processor(s) 310 and can be stored in memory 315.

Communication interface 305 can include any circuitry allowing or enabling one or more components of seismic data processing apparatus 301 to communicate with one or more additional devices, servers, and/or systems—for example, one or more of information system 340, control device 350, source 102-1 . . . 102-m, receivers 105-1 . . . 105-n, and resource extraction equipment 380. As an illustrative example, data recorded by receivers 105-1 . . . 105-n can be transmitted over network 320 to seismic data processing apparatus 301 using any number of communications protocols either directly or through control device 350. For example, network(s) 320 can be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that can be used to facilitate communications between seismic data processing apparatus 301 and control device 350. Various additional communication protocols can be used to facilitate communications between seismic data processing apparatus 301 and control device 350, include the following non-exhaustive list, Wi-Fi (e.g., 802.11 protocol), Bluetooth, radio frequency systems (e.g., 900 MHz, 1.4 GHz, and 5.6 GHz communication systems), cellular networks, FTP, RTP, RTSP, SSH, to name a few.

Communications systems for facilitating network 320 can include hardware (e.g., hardware for wired and/or wireless connections) and/or software. In embodiments, communications systems can include one or more communications chipsets, such as a GSM chipset, CDMA chipset, LTE chipset, 4G/5G/6G, Wi-Fi chipset, Bluetooth chipset, to name a few, and/or combinations thereof. Wired connections can be adapted for use with cable, plain old telephone service (POTS) (telephone), fiber (such as Hybrid Fiber Coaxial), xDSL, to name a few, and wired connections can use coaxial cable, fiber, copper wire (such as twisted pair copper wire), and/or combinations thereof, to name a few. Wired connections can be provided through telephone ports, Ethernet ports, USB ports, and/or other data ports, such as Apple 30-pin connector ports or Apple Lightning connector ports, to name a few. Wireless connections can include cellular or cellular data connections and protocols (e.g., digital cellular, PCS, CDPD, GPRS, EDGE, CDMA2000, 1xRTT, RFC 1149, Ev-DO, HSPA, UMTS, 3G, 4G, LTE, 5G, and/or 6G to name a few), Bluetooth, Bluetooth Low Energy, Wi-Fi, radio, satellite, infrared connections, ZigBee communication protocols, to name a few. Communications interface hardware and/or software, which can be used to communicate over wired and/or wireless connections, can include Ethernet interfaces (e.g., supporting a TCP/IP stack), X.25 interfaces, T1 interfaces, and/or antennas, to name a few. Computer systems—such as seismic data processing apparatus 301, information system 340, and control device 350—can communicate with other computer systems or devices directly and/or indirectly, e.g., through a data network, such as the Internet, a telephone network, a mobile broadband network (such as a cellular data network), a mesh network, Wi-Fi, WAP, LAN, and/or WAN, to name a few.

Information system 340 incorporates data storage 345 that embodies storage media for storing data from sources 102-1 . . . 102-m (such as operation history and location information), receivers 105-1 . . . 105-n (including seismic shot gather data), seismic data processing apparatus 301 (including results of exemplary seismic data processing described in further detail below), and control device 350 (including operation history, control parameters, location information, etc., of sources (102), receivers (105), and resource extraction equipment 380). Exemplary storage media for data storage 345 correspond to those described above with respect to memory 315, which will not be repeated here. In embodiments, information system 340 incorporates one or more database servers that support NoSQL, MySQL, Oracle, SQL Server, NewSQL, and/or the like. Information system 340 incorporates a communication interface (not shown) for communications with the aforementioned entities—i.e., sources 102-1 . . . 102-m, receivers 105-1 . . . 105-n, seismic data processing apparatus 301, control device 350, and resource extraction equipment 380—and exemplary implements of which can include those described above with respect to communication interface 305, which will not be repeated here.

In correspondence with seismic data processing apparatus 301, control device 350 is a computing device with one or more processor(s) 355 exemplary implements of which can include those described above with respect to processor(s) 310, which will not be repeated here.

Memory 365 can include one or more types of storage mediums such as any volatile or non-volatile memory, or any removable or non-removable memory implemented in any suitable manner to store data for control device 350. Exemplary implements of memory 365 can include those described above with respect to memory 315, which will not be repeated here.

Communication interface 370 can include any circuitry allowing or enabling one or more components of control device 350 to communicate with one or more additional devices, servers, and/or systems. Exemplary implements of communication interface 370 can include those described above with respect to communication interface 305, which will not be repeated here. Additionally, communications interface 370 can use any communications protocol, such as any of the previously mentioned exemplary communications protocols for communicating with and controlling sources 102-1 . . . 102-m, receivers 105-1 . . . 105-n, seismic data processing apparatus 301, information system 340, and resource extraction equipment 380. In some embodiments, control device 350 can include one or more antennas to facilitate wireless communications with a network using various wireless technologies (e.g., Wi-Fi, Bluetooth, radiofrequency, etc.). In yet another embodiment, control device 350 can include one or more universal serial bus ("USB") ports, one or more Ethernet or broadband ports, and/or any other type of hardwire access port so that communication interface 370 allows control device 350 to communicate with sources 102-1 . . . 102-m, receivers 105-1 . . . 105-n, natural resource extraction equipment 380, seismic data processing apparatus 301, information system 340, or another control device (not shown).

User interface 360 is operatively connected to processor(s) 355 and can include one or more input or output device(s), such as switch(es), button(s), key(s), a touch screen, a display, microphone, camera(s), sensor(s), etc. as would be understood in the art of electronic computing devices. Display of user interface 360 can be used to display the final surface map described in further detail below.

As will be described in further detail below, according to an exemplary embodiment, the final surface map outputted by seismic data processing apparatus 301 is used to adjust and enhance natural resource extraction operations by extraction equipment 380 via control device 350. According to another exemplary embodiment, the outputted final surface map by seismic data processing apparatus 301 is used to direct further surveying by sources (102) and receivers (105) via control device 350, as will be described below.

In embodiments, functionality of apparatuses 301 and 350 can be consolidated to a singular apparatus or system that is communicatively coupled to sources (102) and receivers (105) for collecting seismic data therefrom and for processing and storing the data in information system 340. In embodiments, information system 340 can also be consolidated with apparatus 301 and/or control device 350. Additionally, in embodiments, separate and independent control devices (not shown) can be incorporated to communicate with and/or control sources 102-1 . . . 102-$m$, receivers 105-1 . . . 105-$n$, and natural resource extraction equipment 380, respectively. In other words, computing devices and/or data processing apparatuses capable of embodying the systems and/or methods described herein can include any suitable type of electronic device including, but are not limited to, desktop computers, mobile computers (e.g., laptops, ultrabooks), mobile phones, portable computing devices, such as smart phones, tablets, personal display devices, personal digital assistants ("PDAs"), virtual reality devices, wearable devices (e.g., watches), to name a few.

According to an exemplary embodiment, each seismic source (102) is controlled to generate a seismic shot at a different time for receivers (105) to record respective traces therefrom. In embodiments, a single seismic source—e.g., 102-1—can be deployed at a known location which is recorded and which is identifiable to signal traces sent from that location, and can be moved to different predetermined locations and orientations in and about a geographical area of interest on surface 107, with each location being recorded the same as the first, so as to generate seismic shots for gather traces at receivers (105). Seismic waves detected at receivers (105) are translated to electrical signals, which are recorded over a time at control device 350 and/or information system 340 for processing and interpretation.

Referring back to FIGS. 1 and 2, subsurface geohazard 130 can take various forms and influence seismic traces 115-1 and 115-2 generated by sources 102-1 and 102-2 and/or gathered by receivers 105-1 and 105-2. More specifically, as discussed above, subsurface geohazard 130—if in the form of faulted rocks, sink holes, unconsolidated depositions, and the like—would attenuate and/or scatter the seismic wave of traces 115-1 and 115-2 from sources 102-1 and 102-2, respectively. As noted above, high frequency components of such traces are more susceptible to the attenuation and/or scattering. Consequently, the seismic energy received at receivers 105-1 and 105-2 is reduced by the attenuation and/or scattering, with the loss of energy in the high frequency components being accentuated. In other words, the energy ratio between the low frequency and high frequency components would be higher for traces 115-1 and 115-2 than those that do not traverse geohazard 130, for example, those signals that are traced at other receivers (105) placed at other locations on ground surface 107 where a trace path from source 102-1 or source 102-2 does not intersect or traverse geohazard 130. Correspondingly, there can be more traces from 102-1 with the aforementioned higher energy ratio in view of the proximity of geohazard to source 102-1 resulting in a wider angle of influence on signals emanating from source 102-1 than those from 102-2. As illustrated in FIG. 2, the angle of influence of geohazard 130 on seismic traces from source 102-2 is considerably narrower than its influence on those from source 102-1 given its proximity to receiver 105-2. In other words, geohazard 130 likely only influences trace 115-2 and possibly a small number of adjacent traces (not shown) that also happen to traverse geohazard 130 from source 102-2. As will be described in further detail below, the seismic data processing according to an exemplary embodiment of the present disclosure targets and locates these changes in low-high frequency ratios and thereby accounts for the difference in effect by proximity to sources and receivers to accurately identify surface locations with high probabilities of having geohazards in their immediate subsurface proximities.

Figure 4A:
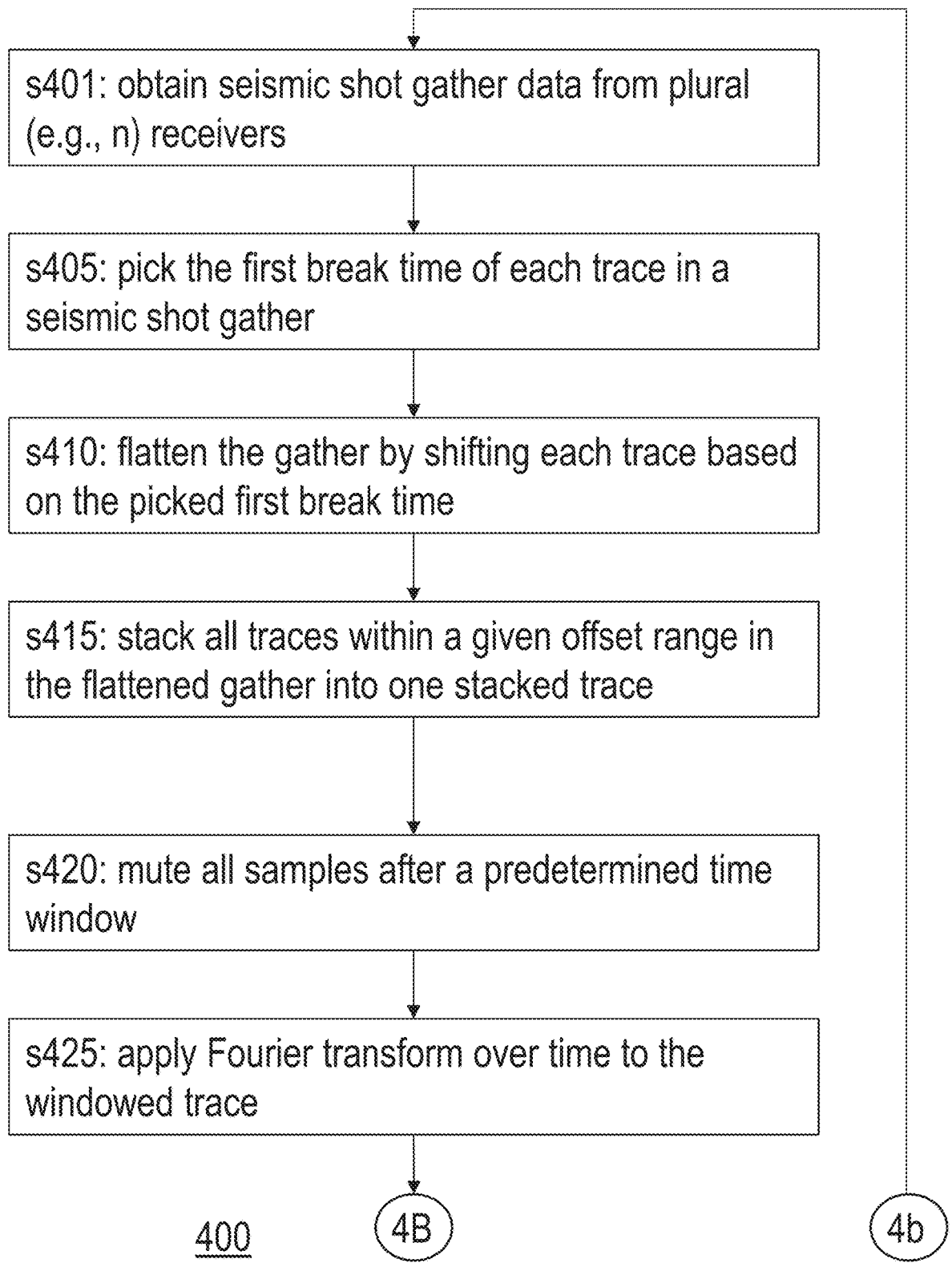
FIGS. 4A and 4B together form a flow diagram of a process for analyzing seismic shot gather data to identify and locate subsurface geohazards in accordance with an exemplary embodiment of the present disclosure.
Figure 4B:
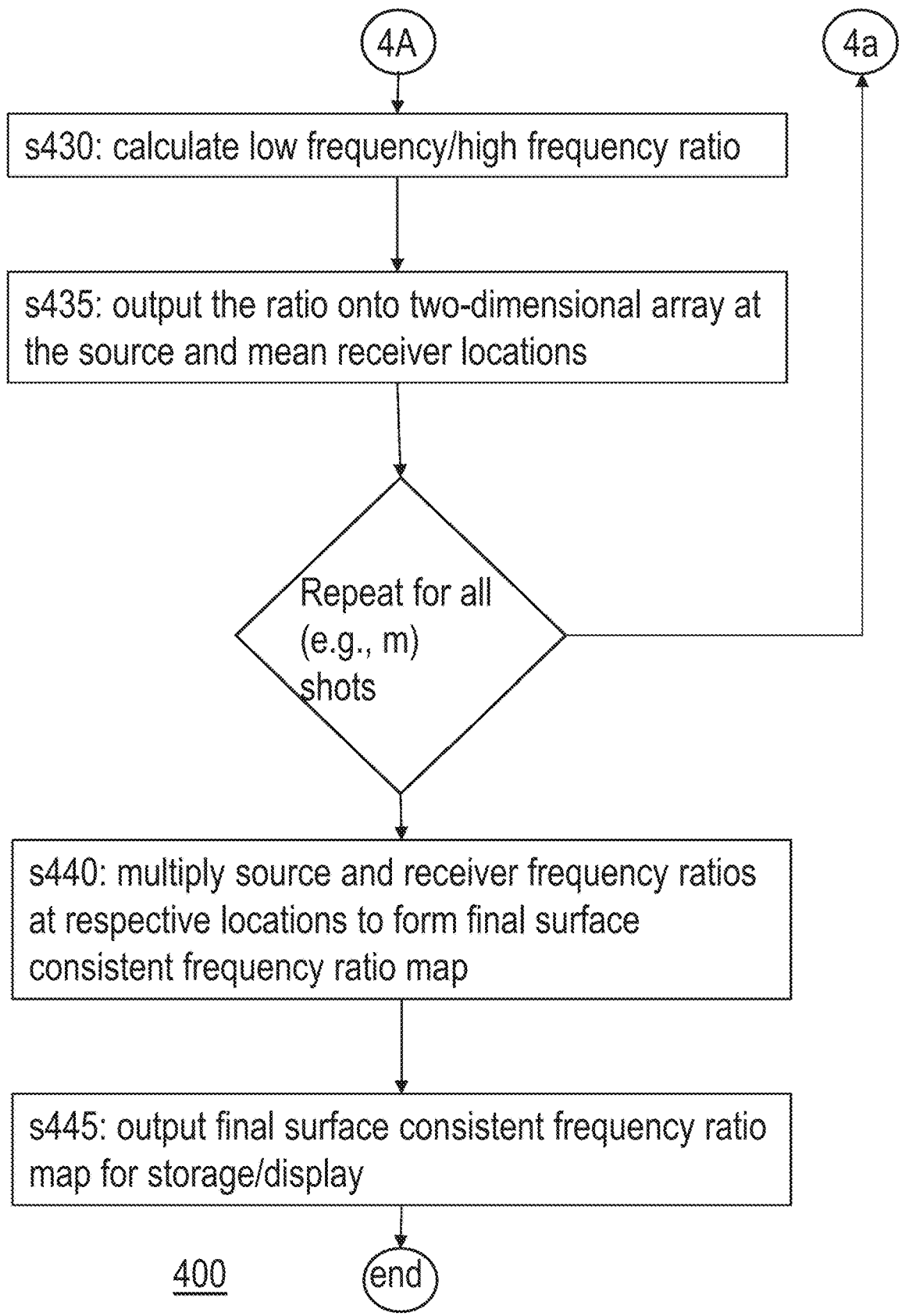

FIGS. 4A and 4B together form a flow diagram of a process 400 for converting recorded seismic trace data into a surface map that indicates relative probabilities of subsurface geohazards at respective locations in accordance with an exemplary embodiment of the present disclosure. According to an exemplary embodiment, with reference to FIG. 3, process 400 is executed by seismic data processing apparatus 301 for outputting a final surface map to information system 340 for storage and to control device 350 for display on user interface 360. In embodiments, one or more steps in process 400 can be executed by control device 350 or information system 340, with data corresponding to the final surface map being stored at one or more of the memory and storage elements of these apparatuses.

As illustrated in FIG. 4A, process 400 is initiated at seismic data processing apparatus 301 by obtaining seismic shot gather data for a particular seismic shot gather (e.g., from source 102-1), as illustrated by step s401. As noted above, the data can be obtained from control device 350 or directly from receivers 105-1 . . . , and 105-$n$ (or a subset that is in range to record a trace signal from the source (102)) when the traces are recorded. Alternatively, the data can be retrieved from storage—for example, from information system 340. Once the shot data is obtained from all of the applicable receivers (105), at step s405, a first break time is picked for each trace from the seismic shot gather. In other words, a first arrival time of each trace at a corresponding receiver 105-1 . . . , and 105-$n$ (or a subset thereof) from a seismic shot source 102-1 . . . , or 102-$m$ is picked. In embodiments, a modified energy ratio (MER), Short Time Average over Long Time Average (STA/LTA) ratio or Entropy Method (EM) can be used as a basis for first-break time-picking. In embodiments, other advanced techniques such as methods utilizing a Random Sample Consensus (RANSAC) algorithm can also be used. A cross-correlation technique (CCT) among proximate traces can also be applied. Additionally, in embodiments, refraction interferometry, or "super-virtual refraction interferometry" can be used to enhance refracted energy for the first-break time-picking on each trace, especially for far-offset traces at receivers (105) that are more than 500 meters away from a shot source (102). In embodiments, other techniques such as super-grouping or non-linear beam forming can also be utilized.

At step s410, the seismic shot gather is flattened by shifting each trace to a reference time based on its respective first break time that is picked at step s405 by (1) choosing a reference time (t_ref); (2) shifting the picked first break time to the reference time which makes the picked first break flat; (3) repeating for all the traces. Hence, the gather is flattened.

Figure 9:
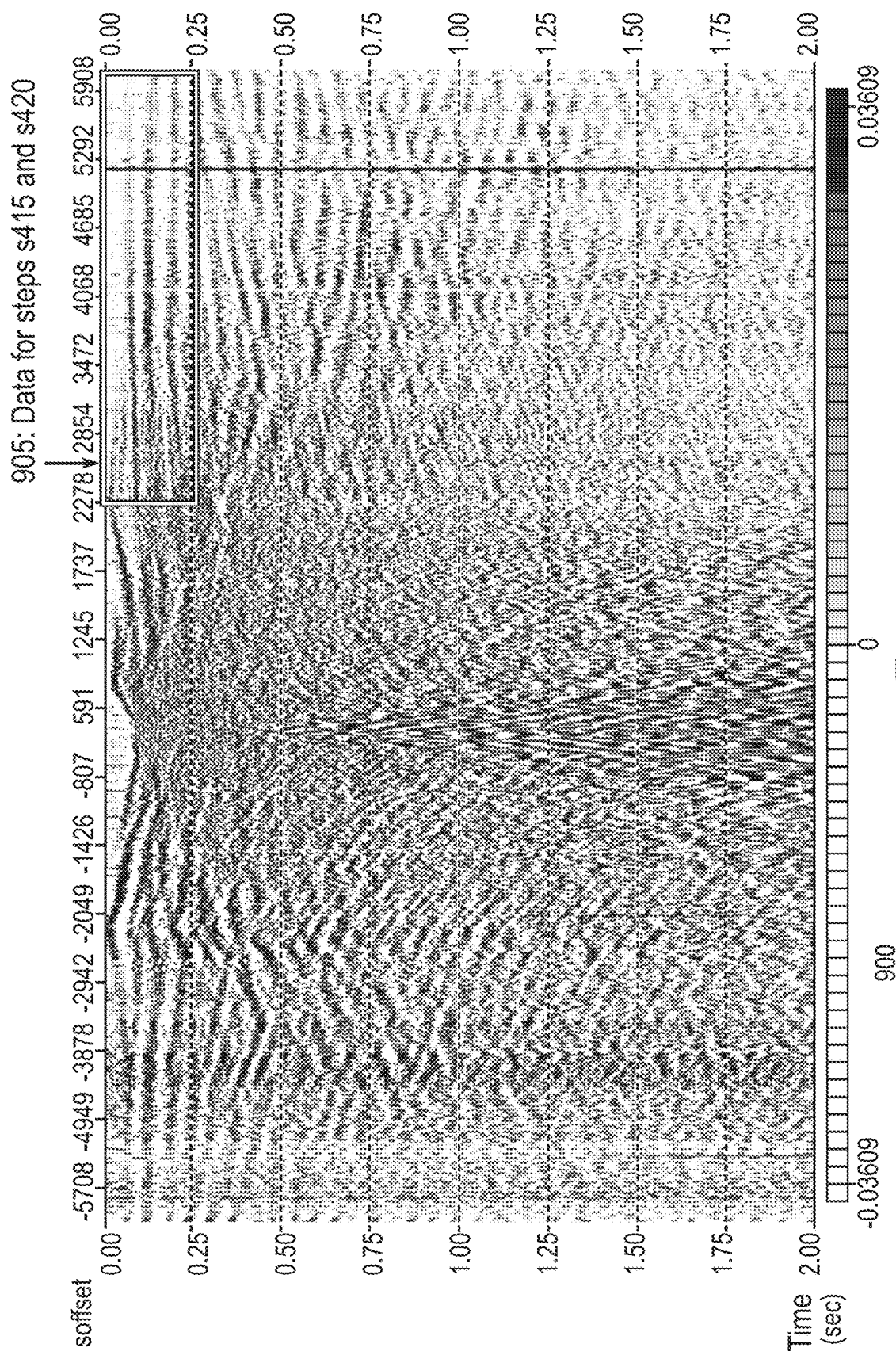
FIG. 9 is the graph plot of FIG. 8 flattened according to step s410 of FIG. 4 and showing a box 900 containing the data used to compile resulting frequency ratio heat maps according to an example implementation of the present disclosure.

Next, at step s415, all of the traces that are flattened in step s410 and that are within a predetermined offset range—i.e., receivers (105) within a range of distances from the seismic shot source (102)—are stacked into one stacked trace. Stacking is a process of merging multiple seismic traces that are in a zero-offset state, which results from the flattening of step s415. The stacking process is done by quantifying the average amplitude of all the trace signals and is expected to improve SNR (signal to noise ratio). The offset distance is the straight-line distance from the source (102) to the particular receiver (105) that recorded the trace in question. According to an exemplary embodiment, traces at a predetermined offset range that is between receiver offsets ranging from hundreds of meters (m) to kilometers (km) from the seismic shot source (102) are stacked at step s415. As will be described in the "examples" subsection below, FIG. 9 illustrates a box 905 indicating an offset range of 2200 m to 6000 m between which receiver traces are stacked. In other words, traces from receivers (105) placed within the range between those offset distances (2200 m to 6000 m) are included in the stack. As can be appreciated by one of ordinary skill in the art, other offset ranges can be used for process 400 without departing from the spirit and scope of the present disclosure.

At step s420, portions of the traces that are recorded after a predetermined time window are muted. The muting process is carried out by defining the area to be removed first, and then, the amplitude of that region is made equal to zero. A muting process is commonly used in seismic survey methods to isolate a seismic shot trace signal and mute other signals, such as those from direct waves, ground-roll, etc. The seismic refraction analysis of the present disclosure includes the muting of reflection signals that arrive past the predetermined window. According to an exemplary embodiment, the predetermined time window is from approximately 0 ms (milliseconds) to 250 ms (after the flattening process).

Next, at step s425, a Fourier transform over time is applied to the windowed trace. In other words, the windowed trace that is represented in time-domain versus (range or) distance (t-x) is transformed using a 1D Fourier transform, which transforms the time series data into frequency domain data. The results of the transform can then be displayed in terms of distance and frequency. According to an exemplary embodiment, the Fourier transformation is expressed by $$F(\omega) = \int_{-\infty}^{\infty} f(t) e^{-i\omega t} dt = FT(f(t)) \quad (1),$$

where t=time and ω=frequency.

Referring now to FIG. 4B, process 400 proceeds to step s430 where a low frequency/high frequency ratio is calculated by dividing the results of step s425 into low frequency and high frequency components. According to an exemplary embodiment, trace signal components below 35 Hz (hertz) are low frequency components and those above 35 Hz are high frequency components. At step s430, the amplitudes of the low frequency components are summed and the high frequency components are also summed. Then, the summed low frequency amplitudes are divided by the summed high frequency amplitudes to yield the low frequency/high frequency ratio. Next, at step s435, the low frequency/high frequency ratio is outputted onto a two-dimensional array representative of a surface map of ground surface 107 corresponding to the geographical area of interest surveyed by the seismic shot gather. More specifically, according to an exemplary embodiment, the ratio is output to the location of the source (102) of the shot gather and the mean location of the receivers (105) that recorded the traces of the shot gather and that are within the offset range for the stacking of step s415—in other words, the receivers (105) corresponding to the stacked trace of step s415. As illustrated in FIG. 4B, process 400 repeats steps s400-s435 for all shot gathers in an around the geographical area of interest—for example, shots from sources 102-2 . . . , and 102-m (or a subset thereof for the geographical area of interest) that are traced by corresponding ones of receivers 105-1 . . . , and 105-n (for a subset thereof).

Once shot gather coverage for the geographical area of interest has been completed, process 400 proceeds to step s440, where the source and receiver frequency ratios at respective locations on the surface map are multiplied by one another in order to amplify and isolate the high frequency component absences from the trace signals received at the respective receivers (105). In other words, each source location frequency ratio outputted at step s435 is multiplied by one or more mean receiver location ratios at the same location on the two-dimensional array outputted at steps s435 to generate the final frequency ratio map. The resulting surface map embodies the final risk map indicating the surface locations that correspond to subsurface geohazards (such as geohazard 130) by indicating where the amplified low frequency/high frequency ratios are elevated. According to an exemplary embodiment, the ratios are plotted onto the surface map as a heat map with respective shades or colors reflecting relative values of the ratios at the respective locations on the surface map. Thus, as an example, a shade or a color associated with an alert, such as yellow or red, can be associated with an elevated ratio range to contrast with other shades or neutral colors, such as green or blue, associated with normal ratio ranges. According to an exemplary embodiment, once the spectral ratios are normalized, the range of values are from 0 to 1 and the range is divided into 3 categories: 0-0.32, 0.33-0.65, and 0.66-1. The respective ranges are used to indicate low, medium, and high risk (likelihood of encountering a subsurface hazard), respectively. In embodiments, at locations and areas where abundant historical drilling data are available, the threshold limits for these ranges can be set and adjusted by incorporating/correlating information of wells with/without problems.

Finally, process 400 proceeds to step s445 where the final surface consistent frequency ratio map is outputted for storage and/or display. According to an exemplary embodiment, seismic data processing apparatus 301 outputs the final surface map to one or more of memory 315, information system 340, and control device 350 for storage. The map can also be displayed on a visual display on control device 350 (user interface 360) or at respective displays on seismic data processing apparatus 301 and/or information system 340 (not shown).

Once the final risk map is obtained, it can be validated by and calibrated to already reported and known drilling indicants/problems in the geographical area of interest. Future planned wells can be placed in areas assigned low/medium risk. If for production/engineering purposes, wells need to be placed in areas with high risk, localized and detailed geo-technical or geophysical studies are to be conducted prior to drilling to ensure safe operations.

Figure 5:
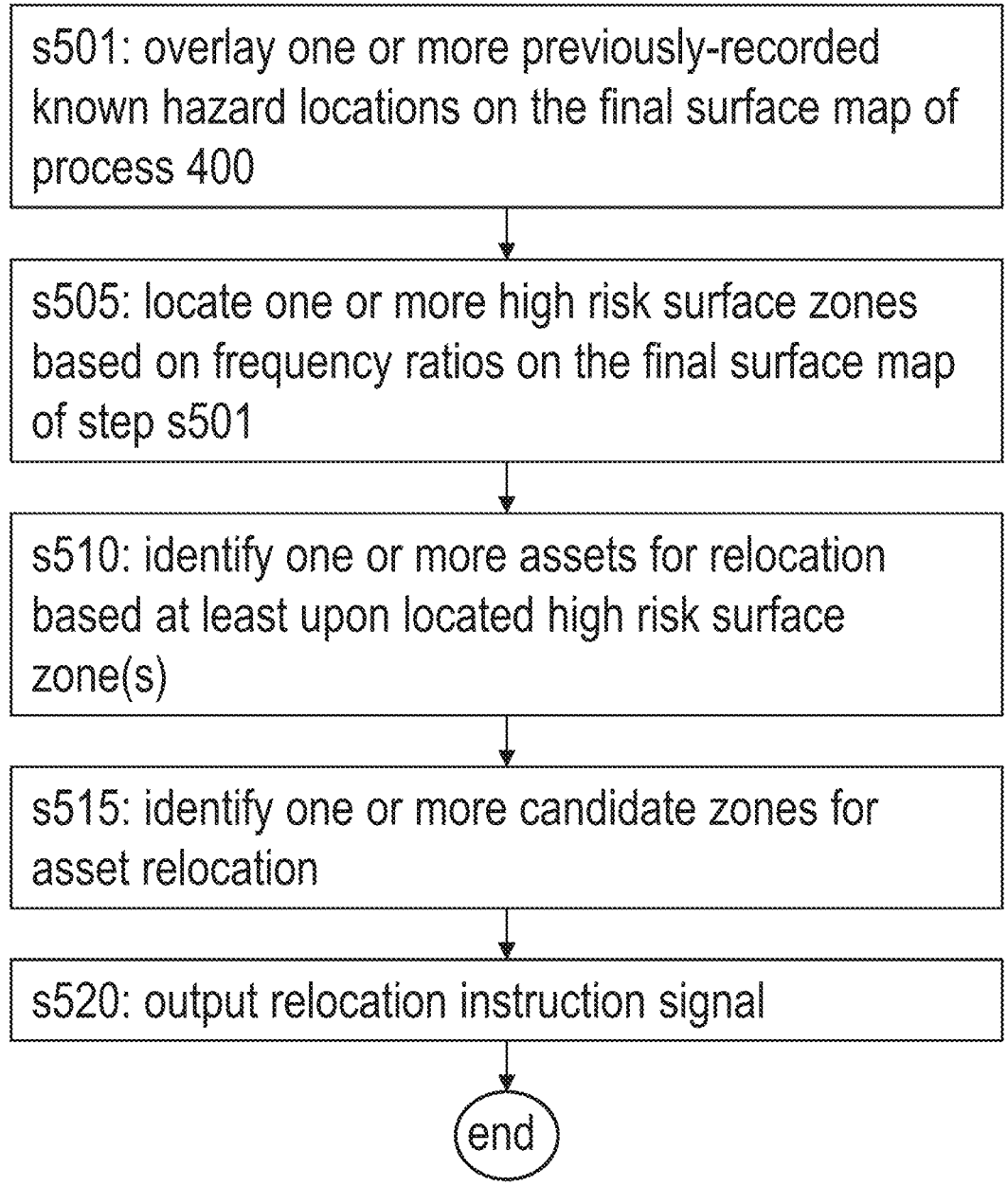
FIG. 5 is a flow diagram of a process for applying the results of FIGS. 4A and 4B to identify and relocate an asset according to an exemplary embodiment of the present disclosure.
Figure 6:
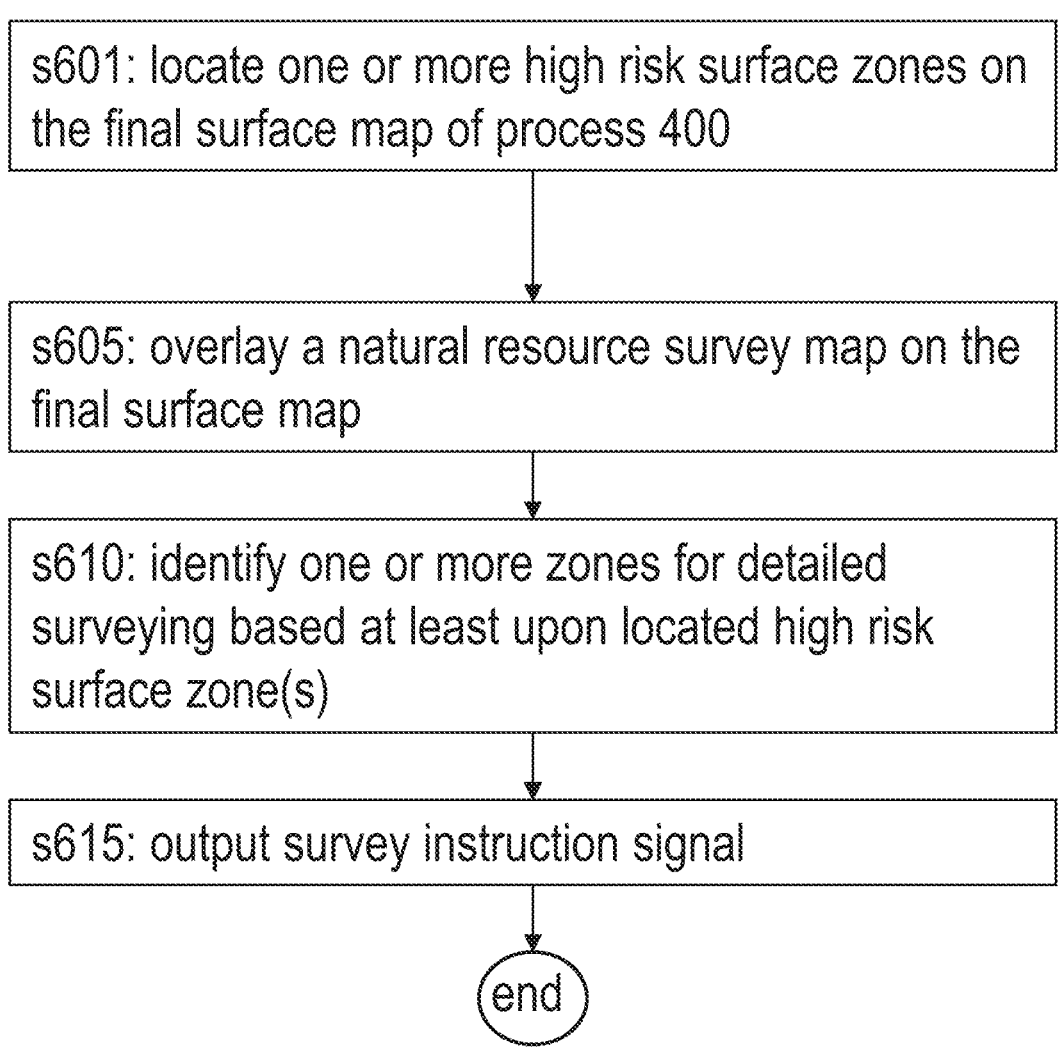
FIG. 6 is a flow diagram of a process for applying the results of FIGS. 4A and 4B to identify a high risk surface zone for additional surveying according to an exemplary embodiment of the present disclosure.

FIGS. 5 and 6 illustrate respective exemplary processes 500 and 600 for utilizing the final risk map produced by process 400 to adjust and enhance natural resource extraction operations and survey operations associated therewith. According to an exemplary embodiment, with reference to FIG. 3, processes 500 and 600 are executed by seismic data processing apparatus 301 for outputting communication signals to control device 350 to control sources (102), receivers (105), or extraction equipment 380 based on the high risk surface zone analyses of these processes. In embodiments, one or more steps in these processes can be executed by control device 350 and information system 340 for generating instructions to control sources (102), receivers (105), or extraction equipment 380 based on these processes.

FIG. 5 is a flow diagram for a process 500 that utilizes the final risk map produced by process 400 to identify and relocate natural resource extraction assets. As illustrated in FIG. 5, process 500 initiates by overlaying one or more previously recorded known hazard locations on the final surface map outputted by processing 400, as illustrated by step s501. According to an exemplary embodiment, such known hazard locations are identified and recorded by previous extraction operations—for example, damage to and problems identified by equipment 380 illustrated in FIG. 3—at information system 340 via control device 350. Accordingly, one or more recorded hazard locations that are within the corresponding area of the final surface map are retrieved from information system 340 and overlayed onto the final surface map.

Next, at step s505, one or more high risk surface zones are located and identified on the final surface map that is outputted by process 400. According to an exemplary embodiment, locations with amplified low/high frequency ratios at or above 0.66 on the final surface map are designated as high risk surface zones. In embodiments, the designated high risk surface zones are confirmed based on locations of known hazards overlayed at step s501. Once a correlation model is established between known problematic locations and the ratio map, the threshold ratio limits can be set and/or adjusted accordingly. In embodiments, if a high risk area is unavoidable for engineering/production related reasons, a detailed geo-technical is conducted prior to a drilling operation. Based on the resolution of a ratio map produced by the process of the present disclosure, which depends on earth properties (nature of refraction wave) as well as the density of sources (102) and receivers (105), a predicted anomaly can be within 200 m to 300 m from the location plotted on the final risk map. Thus, as an example, high risk surface zones within these predetermined distances are confirmed high risk zones. In embodiments, an additional safety buffer distance can be added to the high risk zones.

Process 500 then proceeds to step s510 wherein one or more assets, such as extraction equipment 380 illustrated in FIG. 3, are identified for relocation based at least upon the high risk surface zones designated at step s505. According to an exemplary embodiment, control device 350 identifies one or more of such assets (e.g., equipment 380) that are located proximate—for example, within 200 m to 300 m of—the designated high risk surface zones for relocation. In embodiments, assets still located at known hazards that are recorded and overlayed at step s501 can be identified for relocation.

According to an exemplary embodiment, one or more candidate zones are identified for asset relocation, as illustrated by step s515. The candidate zones are identified based on proximity to the assets identified at step s510 and a distance from the known hazard locations overlayed at step s501 and high risk surface zones designated at step s505.

Once one or more candidate relocation zones have been identified, control device 350 outputs a relocation instruction communication signal to the asset (e.g., equipment 380) identified for relocation, including location information for the one or more candidate relocation zones. In embodiments, a final relocation zone can be identified by control device 350 and incorporated in the instruction signal—as an example, an operator can select from among the candidate relocation zones a final location for a relocated asset using user interface 360 of control device 350 based on observations on the field. According to an exemplary embodiment, at step s520, a relocation instruction signal is outputted based on the final selection for execution at equipment 380 and is stored in one or more of memory 365 and information system 340 shown in FIG. 3.

In more particular embodiments, equipment is relocated in accordance with the relocation instruction signal to the final relocation zone or another of the candidate relocation zones which is clear of the determined high risk surface zones.

FIG. 6 is a flow diagram for a process 600 that utilizes the final risk map produced by process 400 to identify one or more areas for further analysis based on previously-identified natural resource reserves. As illustrated in FIG. 6, process 600 initiates by locating one or more high risk surface zones on the final surface map that is outputted by process 400, as illustrated by step s601. According to an exemplary embodiment, locations with amplified low/high frequency ratios, for example, at or above 0.66 on the final surface map are designated as high risk surface zones. In embodiments, the designated high risk surface zones can be confirmed based on locations of known hazards, such as those overlayed at step s501 of process 500 discussed above.

Next, at step s605, one or more previously recorded known natural resource reserves are overlayed on the final surface map outputted by processing 400. According to an exemplary embodiment, such known natural resource reserves are identified and recorded by previous survey operations at information system 340 via control device 350. Accordingly, one or more recorded reserve locations that are within the corresponding area of the final surface map are retrieved from information system 340 and overlayed onto the final surface map.

Process 600 then proceeds to step s610 wherein one or more of the high risk surface zones that are identified at step s601 are designated for further evaluation based on proximity to and coverage over known reserves overlayed at step s605. According to an exemplary embodiment, control device 350 identifies a high risk surface zone with above 50% coverage over of a known reserve for further evaluation. In other words, a high risk surface zone that overlaps more than 50% of a known reserve that is overlayed on the final surface map at step s605 is designated for further detailed analysis. In embodiments, the coverage percentage threshold for designating a high risk surface zone for further analysis can be between 40% to 100% of an overlayed reserve.

According to an exemplary embodiment, at step s615, a survey instruction signal is outputted based on the designation(s) at step 610 for execution at sources (102) and receivers (105), and is stored in one or more of memory 365 and information system 340 shown in FIG. 3.

In a more particular embodiment, a survey is commenced at one or more locations identified as a potential high risk surface zone by positioning equipment suitable for analysis of the surface and subsurface features. The survey is commenced and conducted prior to locating or relocating assets to a particular location.

EXAMPLES

Embodiments of the present disclosure are described in the following examples, which are offered by way of illustration and not by way of limitation.

Example 1

FIG. 7 shows an example result 700 of process step s401 described above with reference to FIG. 4. As noted above, FIG. 7 is a plot 700 of a shot gather from 5000 receivers (105-1 ... 105-$n$; n=5000) in an example implementation of the present disclosure. The plot 700 shown in FIG. 7 is of a vibroseis shot at 300 m from the nearest receiver (105) that recorded the trace signal.

The distance between the source (102) to each trace (receiver)(105), or offset, is on the x-axis. The sign (+/−) on the x-axis denotes the location of the receiver (105) with respect to source (102) in meters (m)—in other words, to one direction (+) and an opposite direction (−) from the source (102). FIG. 7 shows a range of about −5708 m to 5908 m on the x-axis. The y-axis denotes the recorded two-way travel time in seconds (s). FIG. 7 shows a range of 0 to 2 seconds on the y-axis. As described above, according to an exemplary embodiment, data from receivers (105) in an offset range of about 2200 m to 6000 m is used for subsequent processing to obtain the final risk map.

Example 2

Figure 8:
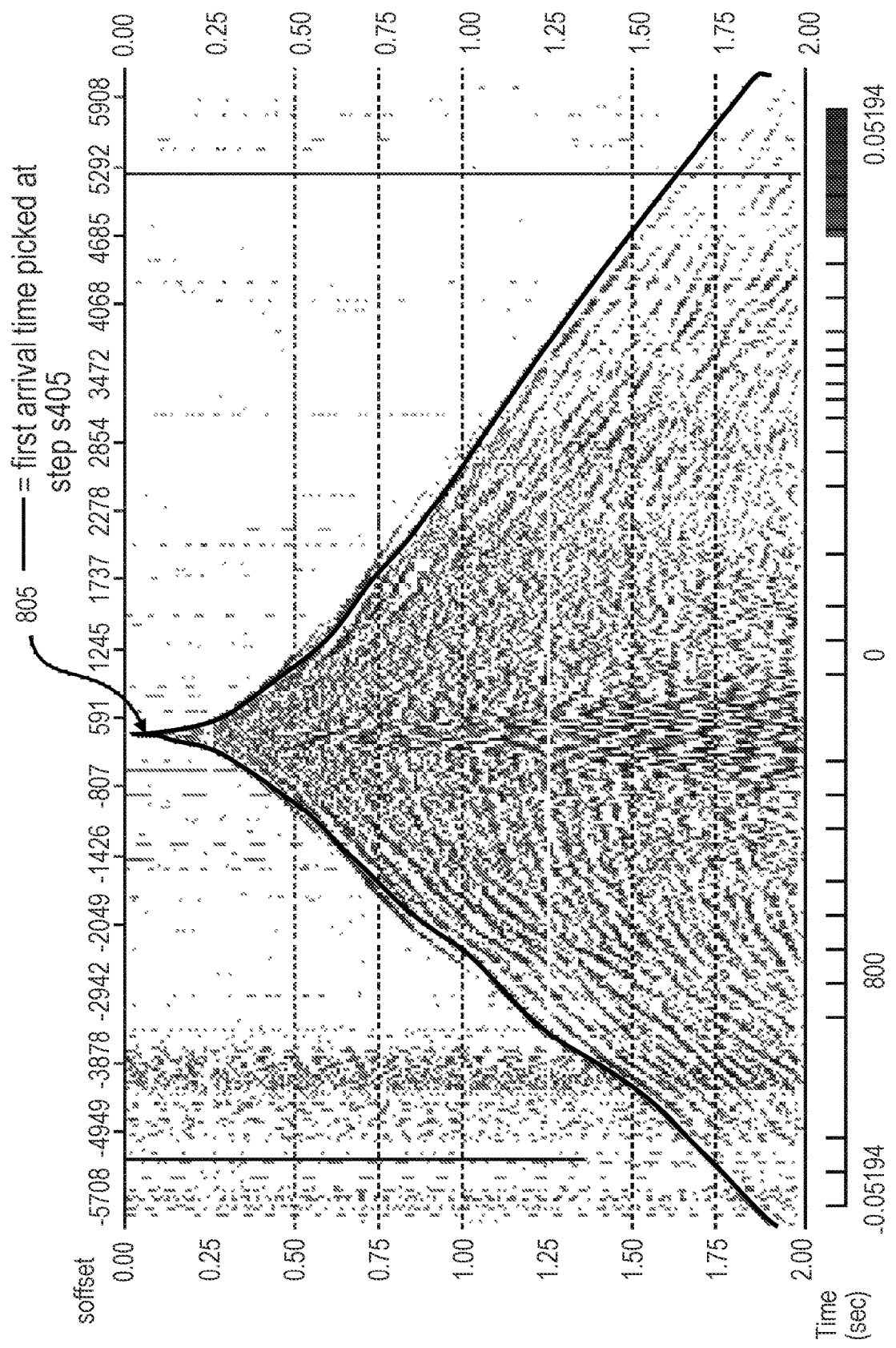
FIG. 8 is the graph plot of FIG. 7 with trace lines 805 indicating first break times picked according to step s405 of FIG. 4.

FIG. 8 shows an example result 800 from FIG. 7 of process step s405 described above with reference to FIG. 4. As shown in FIG. 8, the plot 800 is principally plot 700 of FIG. 7 that is noted with a picked first break time (line indicated with reference numeral 805) for each trace (step s405).

Example 3

FIG. 9 shows an example result 900 from FIG. 8 of process step s410 described above with reference to FIG. 4. As shown in FIG. 9, the plot 800 of FIG. 8 is flattened by shifting the traces based on their respective picked times—in other words, the line 805 of FIG. 8 is shifted to zero on the y-axis in FIG. 9 (step s410)(t_ref=0). FIG. 9 further includes a box 905 that notes the traces within a given offset range and time window representing the data used for the following steps of process 400 in an example implementation of the present disclosure. The dimensions of box 900 noted in FIG. 9 are a signed offset (soffset) range from 2200 m to 6000 m (step s415) and a time window range from 0 ms (millisecond) to 250 ms (step s420). Thus, the flattening of FIG. 9 can be applicable to ~2500 traces in relation to box 900.

Example 4

Figure 10:
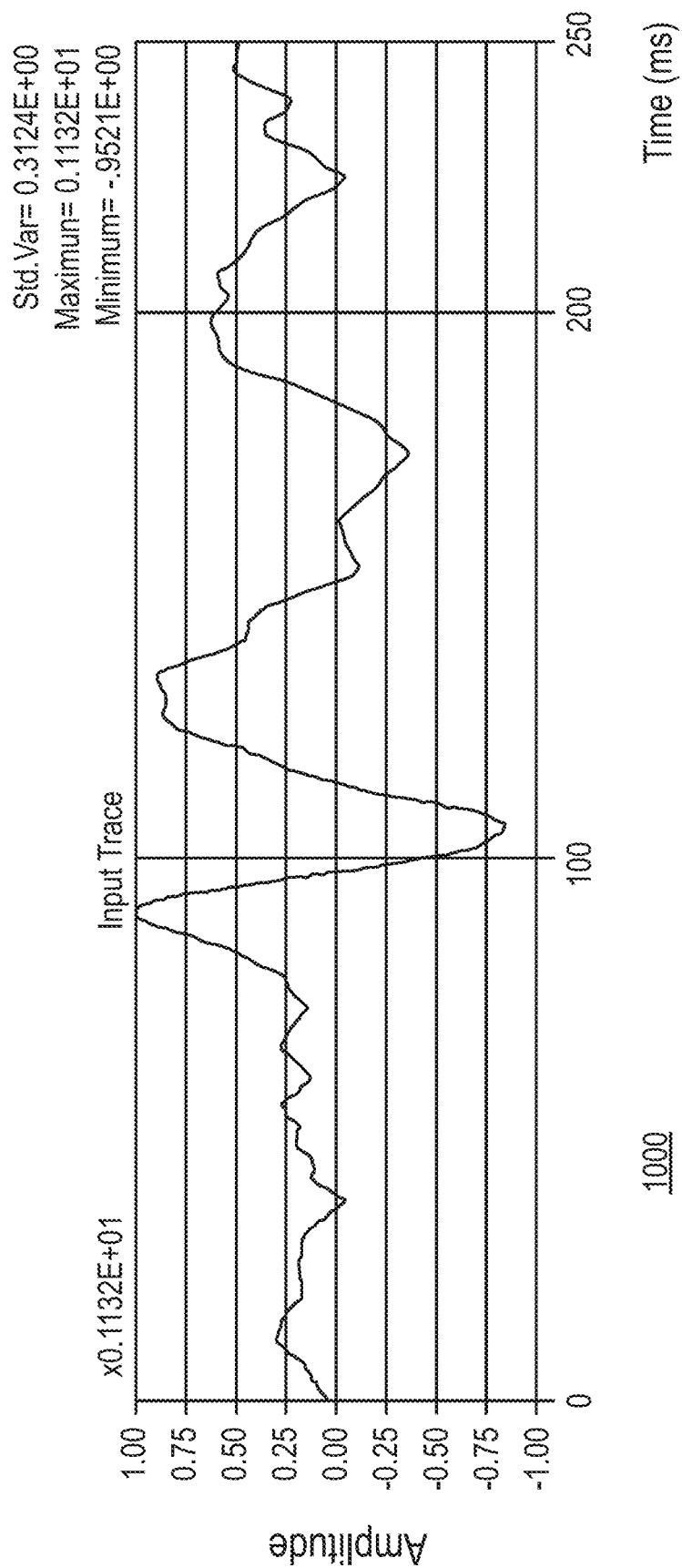
FIG. 10 is a graph plot showing the results of stacking all of the traces within box 900 shown in FIG. 9.

FIG. 10 shows an example result 1000 from FIG. 9 of process steps s415 and s420 described above with reference to FIG. 4. In other words, FIG. 10 shows a result 1000 of stacking all of the traces within box 900 shown in FIG. 9 onto an amplitude output line along the time dimension (x-axis in FIG. 10) within the time window (0 ms-250 ms).

Example 5

Figure 11A:
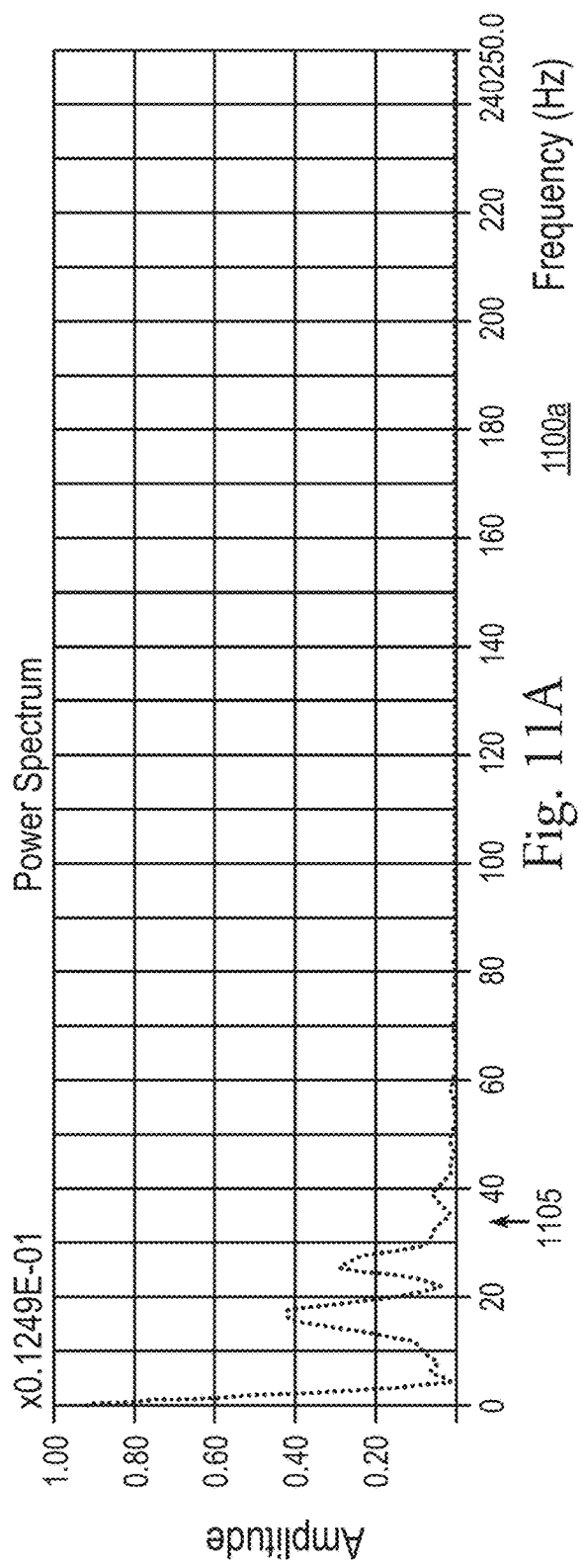
FIGS. 11A and 11B are graphs 1100a and 1100b showing example results from FIG. 10 of process step s425 of FIG. 4.
Figure 11B:
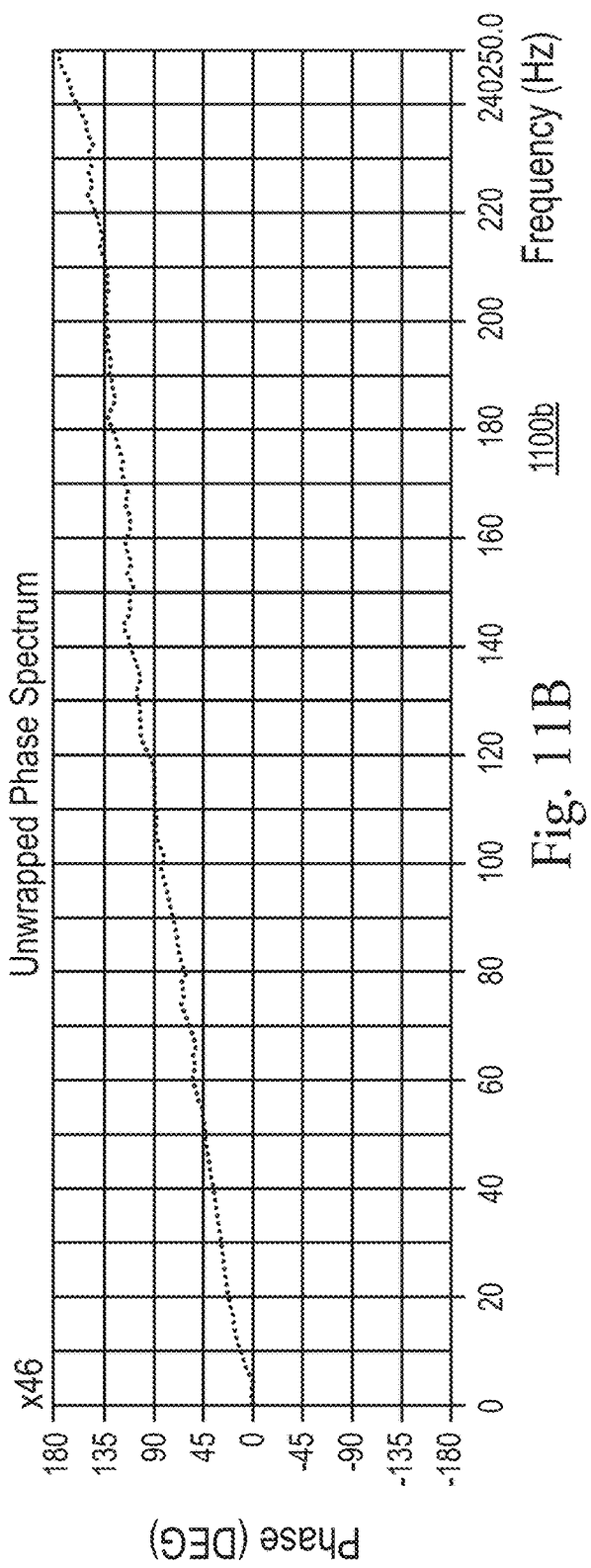

FIGS. 11A and 11B are graphs 1100a and 1100b showing example results from FIG. 10 of process step s425 described above with reference to FIG. 4. FIG. 11A is an output amplitude plot 1100a from applying the Fourier transform to the stacked trace 1000 of FIG. 10. As shown in FIG. 11A, the time domain plot (x-axis) of FIG. 10 is transformed to a frequency domain (x-axis) plot in FIG. 11A. FIG. 11A further includes an arrow 1105 that notes an example dividing frequency (35 Hz) between high frequency components and low frequency components described above with respect to calculating low-frequency and high-frequency ratios. FIG. 11B is an output phase plot 1100b corresponding to the amplitude plot 1100a of FIG. 11A, which resulted from applying the Fourier transform to the stacked trace 1000 of FIG. 10.

Example 6

Figure 12:
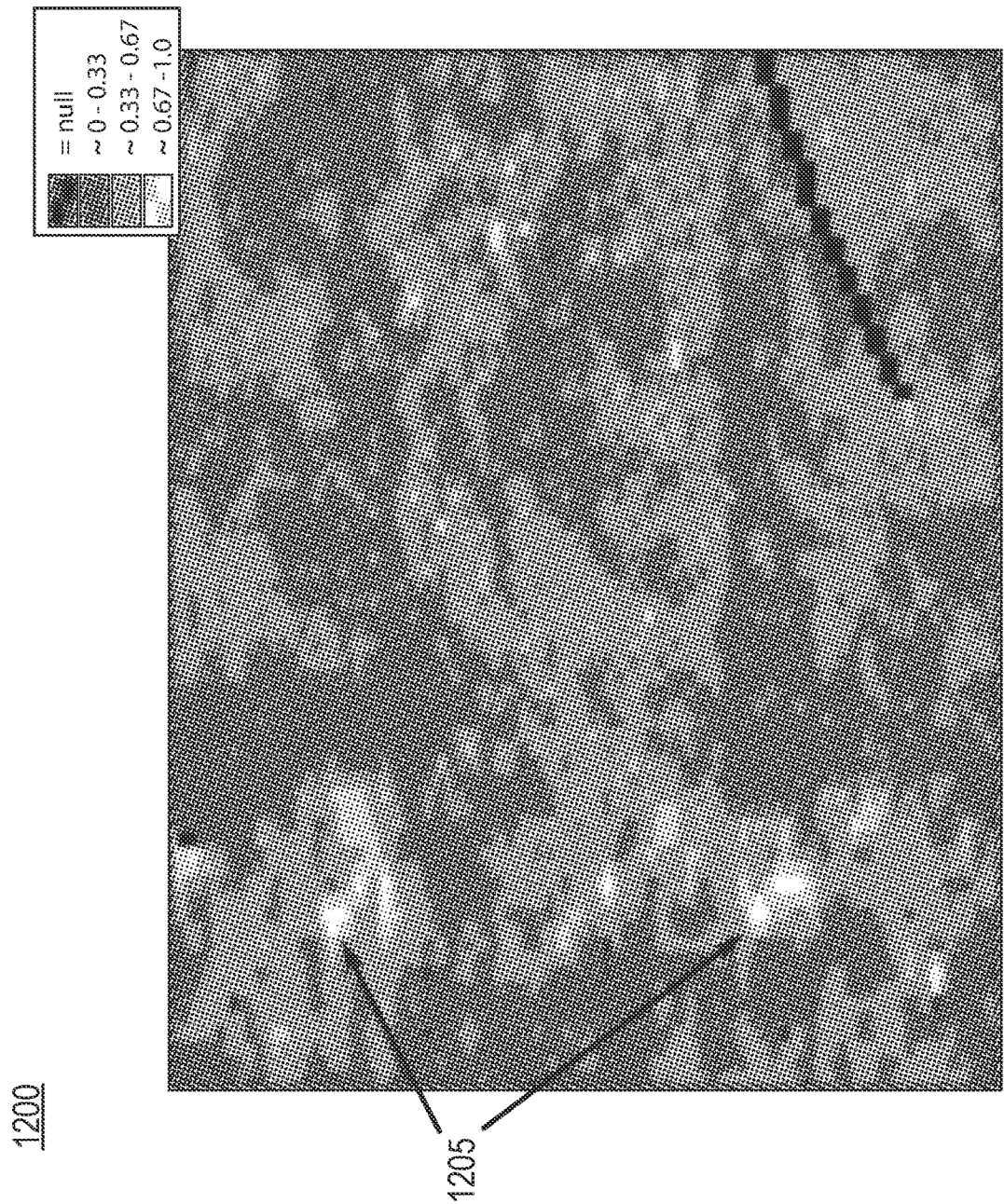
FIG. 12 is a heat map showing example results of process steps s435, s440, and s445 of FIG. 4.

FIG. 12 is an output plot (heat map) 1200 showing example results of process steps s435, s440, and s445 described above with reference to FIG. 4, in part, from the data of FIGS. 11A and 11B. As noted above in Example 5, arrow 1105 in FIG. 11A denotes an example frequency dividing line for calculating the low frequency/high frequency ratio of step s430 describe above. The calculated ratio is outputted onto a two-dimensional array at source and mean receiver locations, as described above with reference to step s435. Next, at steps s440 and s445, the source and receiver frequency ratios from multiple shot gathers are multiplied at respective locations on the two-dimensional array to form a final surface consistent frequency ratio map. FIG. 12 illustrates an example final map 1200 incorporating the multiplication of two (2) two-dimensional arrays.

In FIG. 12, the darkest gray/black shade (or, alternatively, navy blue color) denotes no data (missing shots/receivers) ("null"). The risk scale shown in FIG. 12 is from dark gray (or, alternatively, blue) (small ratio) to bright/white (or, alternatively, yellow) (high ratio), which indicate low risk areas and high risk areas, respectively. Two examples of prominent high risk areas are marked with reference numeral 1205 in FIG. 12. FIG. 12 incorporates example ranges of approximate low/high frequency ratios reflecting the relative risks at the locations in map 1200. Dark gray (or, alternatively, blue) areas represent areas with approximate ratios between 0 to 0.33, lighter gray (or, alternatively, blue/green) areas represent areas with approximate ratios between 0.33 to 0.67, and the bright/white (or, alternatively, yellow) areas represent areas with approximate ratios between 0.67 to 1.0.

According to an example implementation, high risk areas 1205 are identified for avoidance, or localized and detailed geo-technical or geophysical studies, to ensure safe extraction operations.

Example 7

Figure 13A:
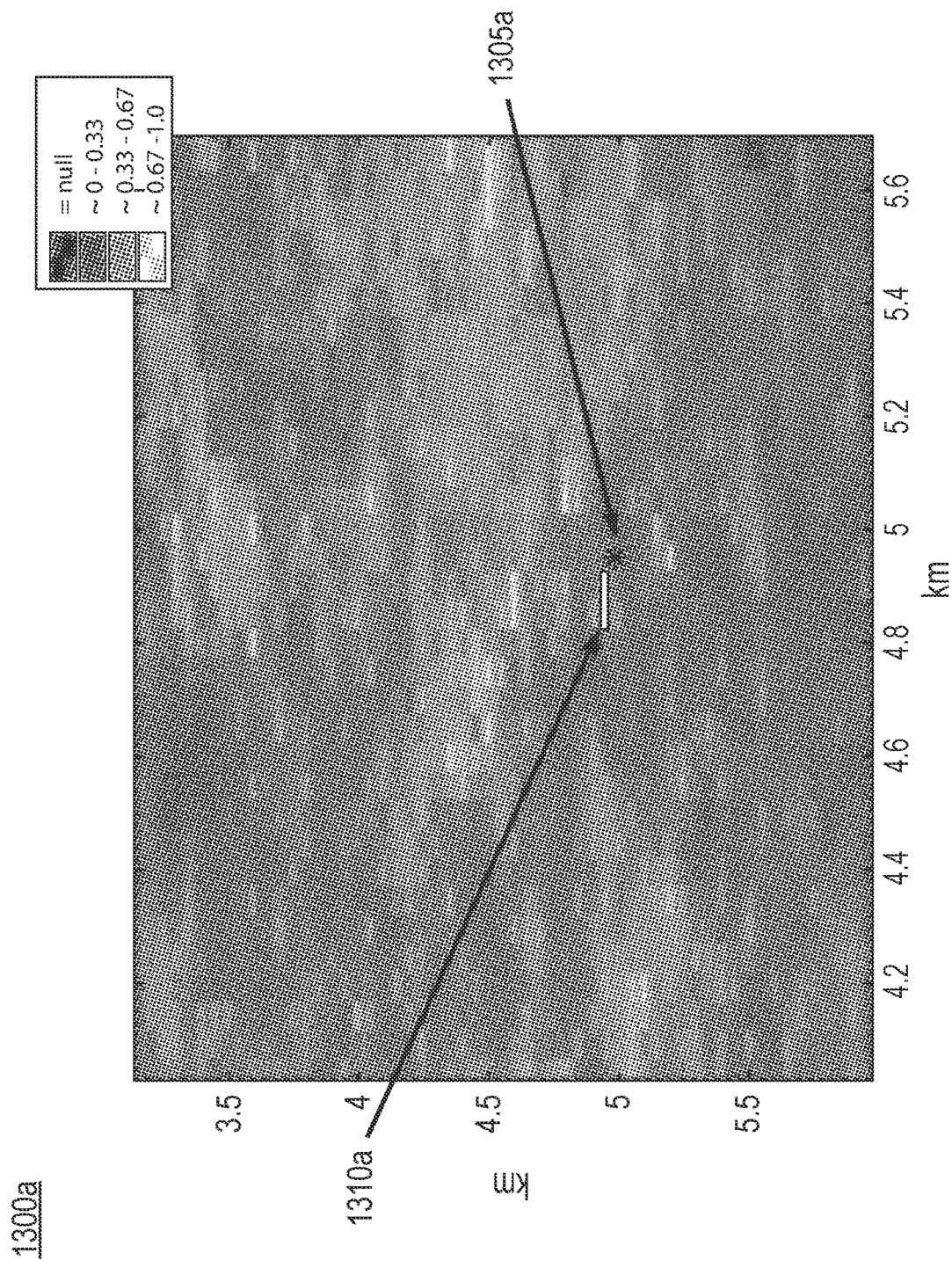
FIGS. 13A, 13B, and 13C are respective example heat maps that are analogous to FIG. 12 and that incorporate respective previously recorded known hazard locations overlaid on the respective frequency ratio heat maps.
Figure 13B:
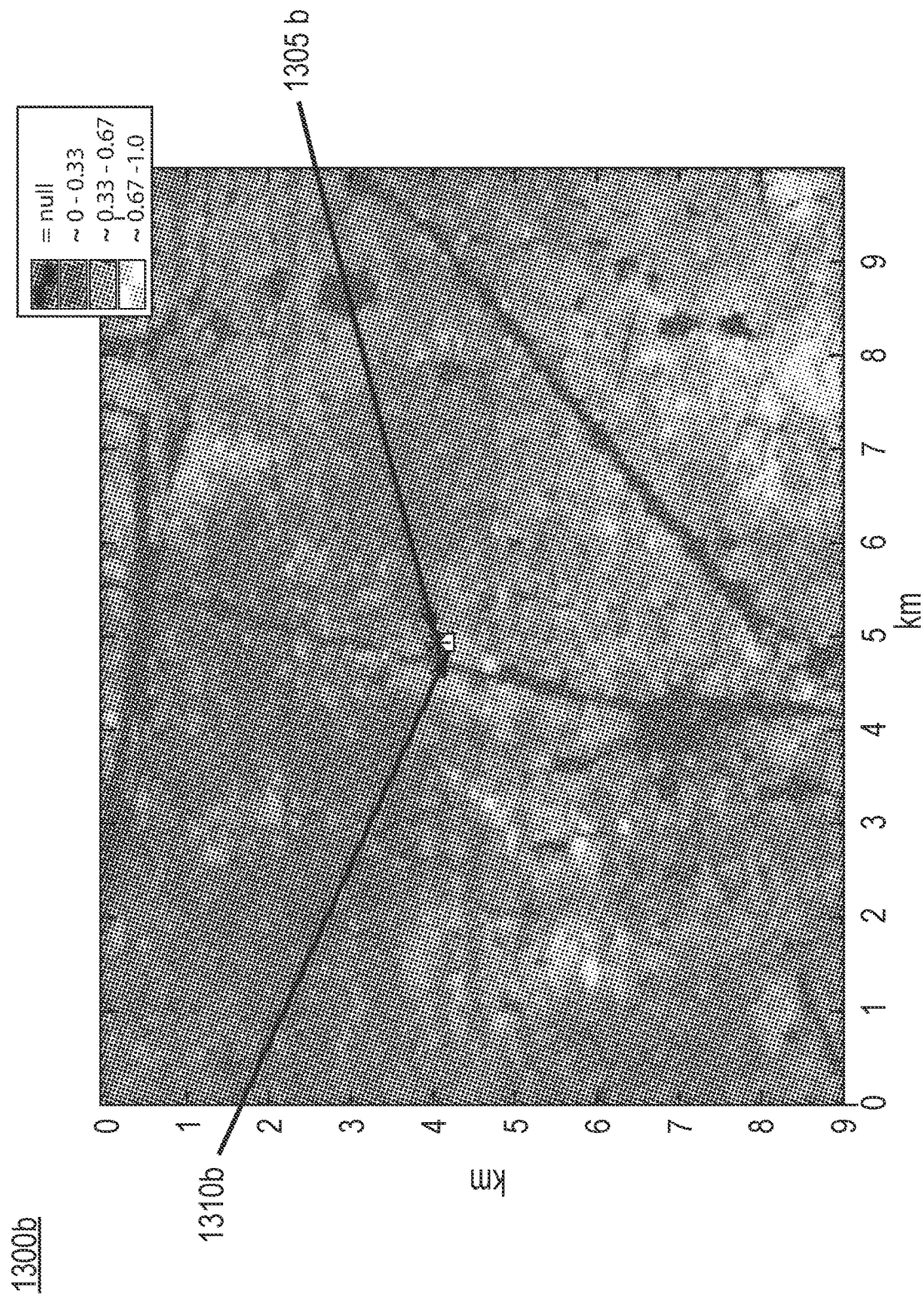
Figure 13C:
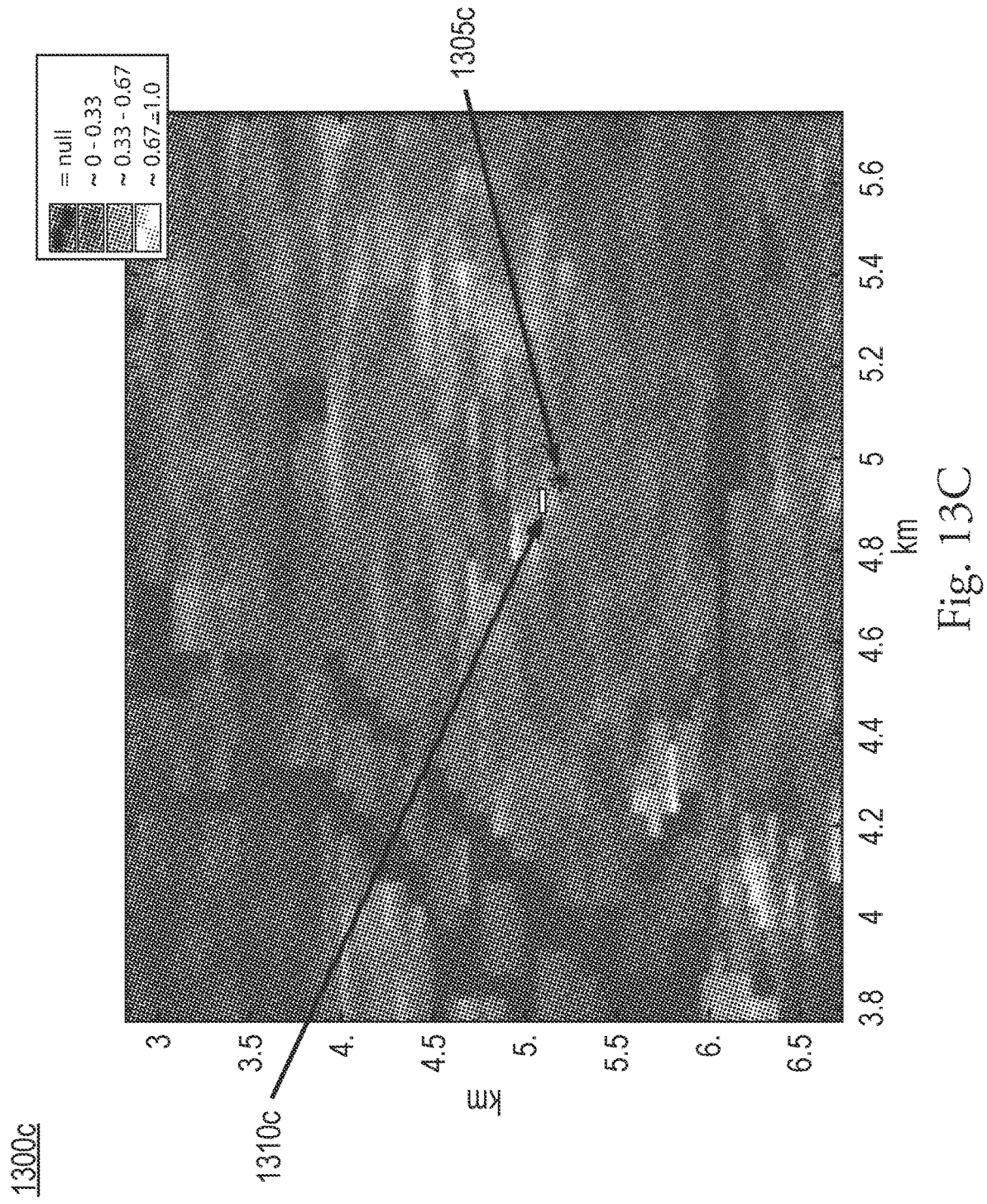

FIGS. 13A, 13B, and 13C are respective example plots (heat maps) 1300a, 1300b, and 1300c, which are analogous to FIG. 12 of Example 6, of respective different geographical areas (and at different area scales) incorporating respective previously recorded known hazard locations (stars 1300a, 1300b, and 1300c, which can be red in color), which are overlaid on the respective frequency ratio maps 1300a, 1300b, and 1300c. Map 1300a of FIG. 13A shows an area of approximately 3 km (3.0 to 6.0 km on y-axis) by 1.7 km (4.0 to 5.7 km on x-axis). Map 1300b of FIG. 13B shows an area of approximately 9 km (0.0 to 9.0 km on y-axis) by 10 km (0.0 to 10.0 km on x-axis). Map 1300c of FIG. 13C shows an area of approximately 4.0 km (2.8 to 6.8 km on y-axis) by 2.0 km (3.8 to 5.8 km on x-axis). The darkest gray/black shade (or, alternatively, navy blue color) denotes no data (missing shots/receivers)("null"). As with FIG. 12, the risk scale shown in FIGS. 13A, 13B, and 13C is from dark gray (or, alternatively, blue) (small ratio) to bright/white (or, alternatively, yellow) (high ratio), which indicate low risk areas and high risk areas, respectively. For example, dark gray (or, alternatively, blue) areas represent areas with approximate ratios between 0 to 0.33, lighter gray (or, alternatively, blue/green) areas represent areas with approximate ratios between 0.33 to 0.67, and the bright/white (or, alternatively, yellow) areas represent areas with approximate ratios between 0.67 to 1.0.

According to an example implementation of the present disclosure, assets located at or near red stars 1300a, 1300b, and 1300c are identified for relocation outside of at least marked high risk areas (red rectangles) 1310a, 1310b, and 1310c proximate red stars 1300a, 1300b, and 1300c in FIGS. 13A, 13B, and 13C, respectively.

According to an example implementation of the present disclosure, high risk areas (red rectangles) 1310a, 1310b, and 1310c shown in FIGS. 13A, 13B, and 13C, respectively, are identified for localized and detailed geo-technical or geophysical studies to ensure safe drilling.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the disclosure. In addition, many modifications will be appreciated by those skilled in the art to adapt a particular instrument, situation, or material to embodiments of the disclosure without departing from the essential scope thereof. Therefore, it is intended that the disclosure not be limited to the particular embodiments disclosed, or to the best mode contemplated for carrying out this disclosure, but that the disclosure will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope encompassed by the present disclosure, which is defined by the set of recitations in the following claims and by structures and functions or steps which are equivalent to these recitations.

What is claimed is:

1. A method of locating subsurface geohazards in a geographical area, comprising:
    (1) receiving, by one or more processing apparatuses via a communication interface, a plurality of seismic trace signals generated by a corresponding plurality of receivers based on a shot gather from a seismic shot source, at least one of the seismic shot source and the corresponding plurality of receivers being located in the geographical area;
    (2) picking, by the one or more processing apparatuses, a respective first break time of each of the plurality of seismic trace signals;
    (3) shifting, by the one or more processing apparatuses, the each seismic trace signal based on its picked respective first break time to flatten the shot gather;
    (4) stacking, by the one or more processing apparatuses, at least a subset of the plurality of seismic trace signals generated by at least a subset of the corresponding plurality of receivers within an offset range into a stacked trace signal;
    (5) muting, by the one or more processing apparatuses, an output of the stacked trace signal after a predetermined time window to generate a windowed trace signal;
    (6) applying, by the one or more processing apparatuses, a Fourier transform over time to the windowed trace signal;

(7) calculating, by the one or more processing apparatuses, a low frequency to high frequency ratio for the transformed trace signal;

(8) outputting, by the one or more processing apparatuses, the calculated ratio to a two-dimensional array representing the geographical area at a source location corresponding to the seismic shot source and at a mean receiver location corresponding to a mean location for the some or all of the corresponding plurality of receivers within the offset range;

(9) repeating, by the one or more processing apparatuses, steps (1) to (8) for a plurality of other shot gathers, wherein at least one of another seismic shot source and another corresponding plurality of receivers is located in the geographical area;

(10) multiplying, by the one or more processing apparatuses, each source location ratio with one or more mean receiver location ratios on the two-dimensional array to generate a final frequency ratio map;

(11) identifying, by the one or more processing apparatuses, one or more high risk surface zones on the final frequency ratio map based on a multiplied ratio threshold; and

(12) outputting, by the one or more processing apparatuses via the communication interface, the final frequency ratio map indicating the one or more identified high risk surface zones.

2. A method of locating subsurface geohazards in a geographical area, comprising:

(1) receiving, by one or more processing apparatuses via a communication interface, a plurality of seismic trace signals generated by a corresponding plurality of receivers based on a shot gather from a seismic shot source, at least one of the seismic shot source and the corresponding plurality of receivers being located in the geographical area;

(2) isolating and stacking, by the one or more processing apparatuses, the plurality of seismic trace signals to generate a windowed trace signal associated with refraction traces from the seismic shot source;

(3) transforming, by the one or more processing apparatus, the windowed trace signal to a frequency domain;

(4) calculating, by the one or more processing apparatuses, a low frequency to high frequency ratio for the transformed trace signal;

(5) outputting, by the one or more processing apparatuses, the calculated ratio to a two-dimensional array representing the geographical area at a source location corresponding to the seismic shot source and at a mean receiver location corresponding to a mean location for the some or all of the corresponding plurality of receivers related to the windowed trace signal;

(6) repeating, by the one or more processing apparatuses, steps (1) to (5) for a plurality of other shot gathers, wherein at least one of another seismic shot source and another corresponding plurality of receivers is located in the geographical area;

(7) multiplying, by the one or more processing apparatuses, each source location ratio with one or more mean receiver location ratios on the two-dimensional array to generate a final frequency ratio map;

(8) identifying, by the one or more processing apparatuses, one or more high risk surface zones on the final frequency ratio map based on a multiplied ratio threshold; and (9) outputting, by the one or more processing apparatuses via the communication interface, the final frequency ratio map indicating the one or more identified high risk surface zones.

3. The method of claim 2, wherein the isolating and stacking comprises:
a. picking, by the one or more processing apparatuses, a respective first break time of each of the plurality of seismic trace signals;
b. shifting, by the one or more processing apparatuses, the each seismic trace signal based on the picked respective first break time to flatten the shot gather;
c. stacking, by the one or more processing apparatuses, at least a subset of the plurality of seismic trace signals generated by at least a subset of the corresponding plurality of receivers within an offset range into a stacked trace signal; and
d. muting, by the one or more processing apparatuses, an output of the stacked trace signal after a predetermined time window to generate the windowed trace signal.

4. The method of claim 3, wherein the offset range is between approximately 2200 meters (m) and 6000 m.

5. The method of claim 3, wherein the predetermined time window is between 0 milliseconds (ms) and approximately 250 ms.

6. The method of claim 2, wherein the transforming comprises applying, by the one or more processing apparatuses, a Fourier transform over time to the windowed trace signal.

7. The method of claim 2, further comprising identifying, by the one or more processing apparatuses, an asset for relocation based on proximity to the one or more identified high risk surface zones in the outputted final frequency ratio map.

8. The method of claim 7, wherein the asset for relocation is identified based on a proximity within approximately 200 meters (m) to 300 m from the one or more identified high risk surface zones in the outputted final frequency ratio map.

9. The method of claim 2, wherein the windowed trace signal is formed by the isolating and stacking of the plurality of seismic trace signals generated by a portion of the corresponding plurality of receivers that are within an offset range from the seismic shot source and that are generated within a predetermined time window from respective first break times of the plurality of seismic trace signals.

10. An apparatus adapted to locate subsurface geohazards in a geographical area, comprising:
(a) a processor;
(b) a communication interface to one or more networks;
(c) a non-transitory computer-readable memory operatively connected to the one or more processors and having stored thereon machine-readable instructions to:
(1) receive, via the communication interface, a plurality of seismic trace signals generated by a corresponding plurality of receivers based on a shot gather from a seismic shot source, at least one of the seismic shot source and the corresponding plurality of receivers being located in the geographical area;
(2) isolate and stack, by the one or more processors, the plurality of seismic trace signals to generate a windowed trace signal associated with refraction traces from the seismic shot source;
(3) transform, by the one or more processors, the windowed trace signal to a frequency domain;
(4) calculate, by the one or more processors, a low frequency to high frequency ratio for the transformed trace signal;

(5) output, by the one or more processors, the calculated ratio to a two-dimensional array representing the geographical area at a source location corresponding to the seismic shot source and at a mean receiver location corresponding to a mean location for the some or all of the corresponding plurality of receivers related to the windowed trace signal;

(6) repeat, by the one or more processors, elements (1) to (5) for a plurality of other shot gathers, wherein at least one of another seismic shot source and another corresponding plurality of receivers is located in the geographical area;

(7) multiply, by the one or more processors, each source location ratio with one or more mean receiver location ratios on the two-dimensional array to generate a final frequency ratio map;

(8) identify, by the one or more processors, one or more high risk surface zones on the final frequency ratio map based on a multiplied ratio threshold; and (9) output, via the communication interface, the final frequency ratio map indicating the one or more identified high risk surface zones.

11. The apparatus of claim 10, wherein the machine-readable instructions further comprise, for the (2) isolate and stack element, instructions to:

a. pick, by the one or more processors, a respective first break time of each of the plurality of seismic trace signals;

b. shift, by the one or more processors, the each seismic trace signal based on the picked respective first break time to flatten the shot gather;

c. stack, by the one or more processors, at least a subset of the plurality of seismic trace signals generated by at least a subset of the corresponding plurality of receivers within an offset range into a stacked trace signal; and d. mute, by the one or more processors, an output of the stacked trace signal after a predetermined time window to generate the windowed trace signal.

12. The apparatus of claim 11, wherein the offset range is between approximately 2200 meters (m) and 6000 m.

13. The apparatus of claim 12, wherein the predetermined time window is between 0 milliseconds (ms) and approximately 250 ms.

14. The apparatus of claim 10, wherein the machine-readable instructions further comprise, for the (3) transform element, instructions to apply, by the one or more processors, a Fourier transform over time to the windowed trace signal.

15. The apparatus of claim 10, wherein the machine-readable instructions further comprise instructions to identify an asset for relocation based on proximity to the one or more identified high risk surface zones in the outputted final frequency ratio map.

16. The apparatus of claim 15, wherein the asset for relocation is identified based on a proximity within approximately 200 meters (m) to 300 m from the one or more identified high risk surface zones in the outputted final frequency ratio map.

17. The apparatus of claim 10, wherein the windowed trace signal is formed by isolating and stacking the plurality of seismic trace signals generated by a portion of the corresponding plurality of receivers that are within an offset range from the seismic shot source and that are generated within a predetermined time window from respective first break times of the plurality of seismic trace signals.

\* \* \* \* \*